(12) United States Patent
Farrand et al.

(10) Patent No.: US 9,485,532 B2
(45) Date of Patent: Nov. 1, 2016

(54) SYSTEM AND METHOD FOR SPECULATIVE TUNING

(75) Inventors: Tobin Farrand, Los Altos Hills, CA (US); Hubert E. Kolde, Mercer Island, WA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 792 days.

(21) Appl. No.: 10/261,114

(22) Filed: Sep. 30, 2002

(65) Prior Publication Data
US 2003/0220091 A1    Nov. 27, 2003

Related U.S. Application Data

(63) Continuation-in-part of application No. 10/121,561, filed on Apr. 11, 2002, now abandoned.

(51) Int. Cl.
| | |
|---|---|
| *H04N 21/426* | (2011.01) |
| *H04N 5/445* | (2011.01) |
| *H04N 5/50* | (2006.01) |
| *H04N 5/76* | (2006.01) |
| *H04N 21/258* | (2011.01) |
| *H04N 21/442* | (2011.01) |
| *H04N 21/443* | (2011.01) |
| *H04N 21/45* | (2011.01) |
| *H04N 21/6547* | (2011.01) |
| *H04N 21/658* | (2011.01) |
| *H04N 5/44* | (2011.01) |
| *H04N 5/45* | (2011.01) |

(Continued)

(52) U.S. Cl.
CPC ...... *H04N 21/4263* (2013.01); *H04N 5/44543* (2013.01); *H04N 5/50* (2013.01); *H04N 5/76* (2013.01); *H04N 21/25891* (2013.01); *H04N 21/443* (2013.01); *H04N 21/44222* (2013.01); *H04N 21/4532* (2013.01); *H04N 21/6547* (2013.01); *H04N 21/6582* (2013.01); *H04N 5/4401* (2013.01); *H04N 5/45* (2013.01); *H04N 5/765* (2013.01); *H04N 5/77* (2013.01); *H04N 5/775* (2013.01)

(58) Field of Classification Search
CPC ............. H04N 21/482; H04N 5/4401; H04N 5/44543; H04N 5/50; H04N 5/46; H04N 2005/44547; H04N 2005/44556; H04N 2005/44565
USPC .......... 725/38, 57, 78, 82, 80; 348/563, 565, 348/731
See application file for complete search history.

(56) References Cited

U.S. PATENT DOCUMENTS 5,699,125 A * 12/1997 Rzeszewski et al. ........... 725/50
5,708,961 A *  1/1998 Hylton et al. .................. 725/81

(Continued)

OTHER PUBLICATIONS

Office Action of Jun. 14, 2007, for U.S. Appl. No. 10/121,561, filed Apr. 11, 2002.

(Continued)

*Primary Examiner* — Benjamin R Bruckart
*Assistant Examiner* — Anthony Bantamoi
(74) *Attorney, Agent, or Firm* — Stewart M. Wiener

(57) ABSTRACT

A method implemented on a multi-tuner receiver system coupled to a plurality of multimedia nodes is disclosed, comprising: monitoring user input on the multi-tuner receiver system; identifying a first channel which the user is likely to select based on the user input; and speculatively tuning to the first channel using a first tuner prior to the user selecting the first channel.

19 Claims, 30 Drawing Sheets

(51) Int. Cl.
*H04N 5/765* (2006.01)
*H04N 5/77* (2006.01)
*H04N 5/775* (2006.01)

(56) References Cited

U.S. PATENT DOCUMENTS

| | | | |
|---|---|---|---|
| 5,933,192 A * | 8/1999 | Crosby et al. | 375/240.25 |
| 5,977,964 A * | 11/1999 | Williams et al. | 715/721 |
| 5,982,411 A * | 11/1999 | Eyer et al. | 725/49 |
| 6,057,831 A * | 5/2000 | Harms et al. | 725/38 |
| 6,115,080 A * | 9/2000 | Reitmeier | 348/731 |
| 6,177,931 B1 * | 1/2001 | Alexander et al. | 725/52 |
| 6,519,011 B1 * | 2/2003 | Shendar | 348/731 |
| 6,588,017 B1 * | 7/2003 | Calderone | 725/120 |
| 6,732,371 B1 | 5/2004 | Lee et al. | |
| 6,804,824 B1 * | 10/2004 | Potrebic | H04N 21/8549 348/732 |
| 6,927,806 B2 * | 8/2005 | Chan | 348/731 |
| 7,284,256 B2 * | 10/2007 | Candelore | H04H 60/43 348/E7.061 |
| 2002/0007490 A1 * | 1/2002 | Jeffery | 725/78 |
| 2002/0080275 A1 | 6/2002 | Bates et al. | |
| 2002/0166123 A1 * | 11/2002 | Schrader et al. | 725/58 |
| 2002/0198762 A1 | 12/2002 | Donato | |
| 2006/0242665 A1 * | 10/2006 | Knee et al. | 725/38 |

OTHER PUBLICATIONS

Office Action mailed Apr. 21, 2008 in U.S. Appl. No. 10/121,561, filed Apr. 11, 2002.
Office Action mailed Nov. 12, 2008 in U.S. Appl. No. 10/121,561, filed Apr. 11, 2002.
Office Action mailed Mar. 4, 2009, for U.S. Appl. No. 10/261,114, filed Sep. 30, 2002.
Office Action mailed Mar. 4, 2009 in U.S. Appl. No. 10/121,561, filed Apr. 11, 2002.

* cited by examiner

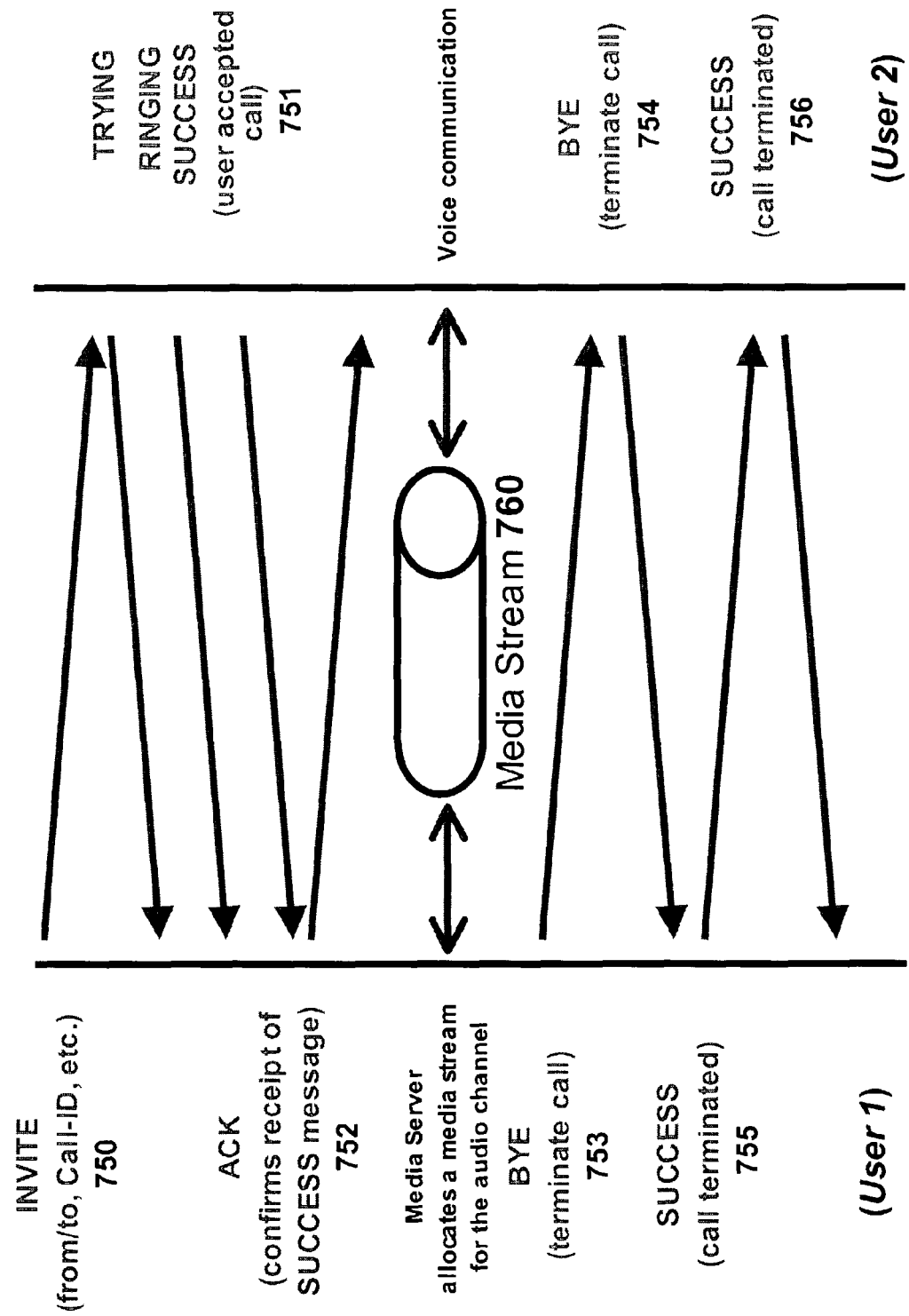

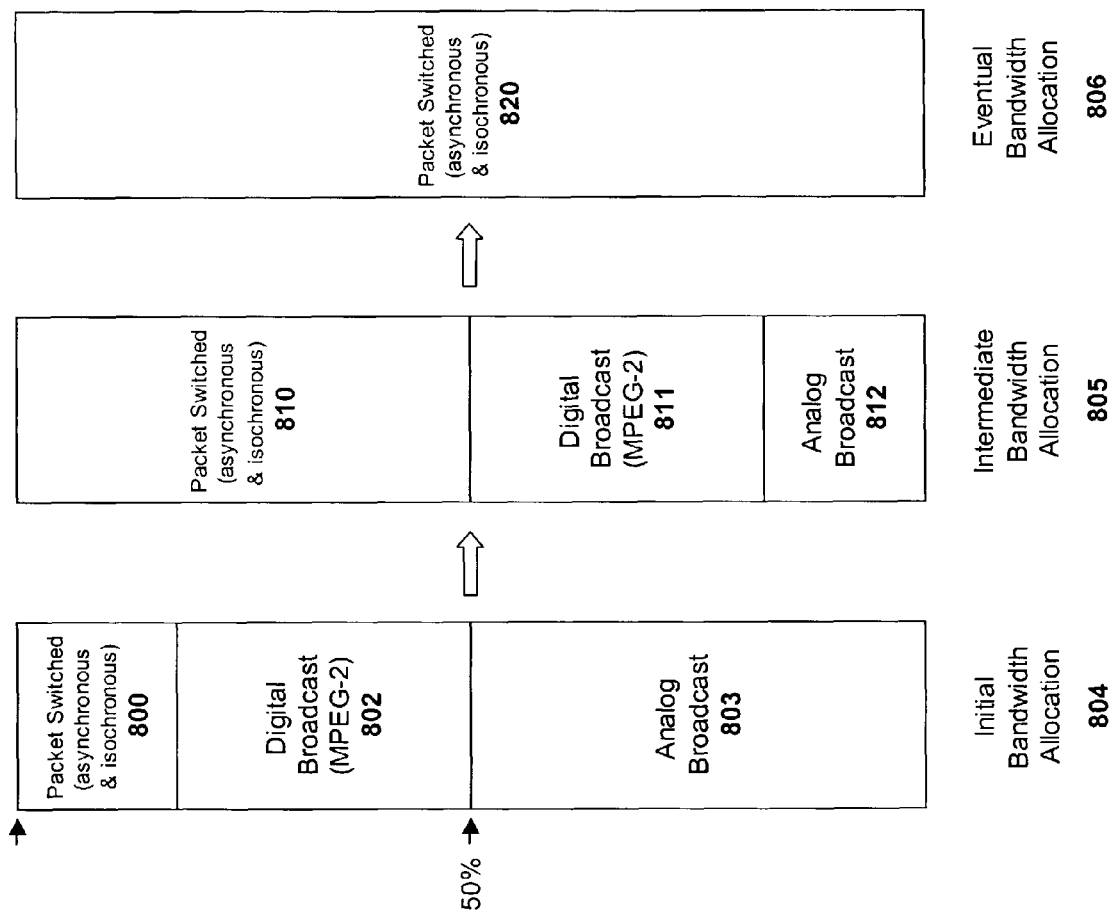

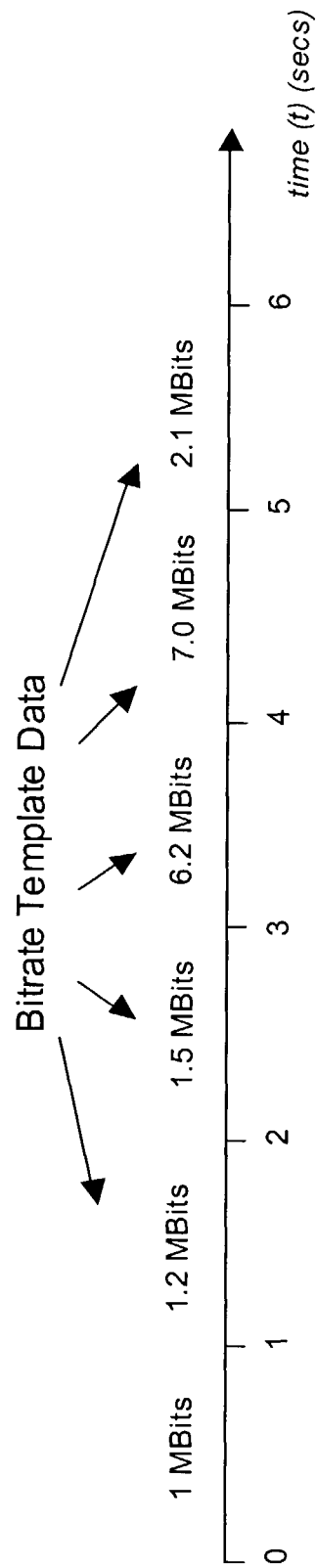

| Today | 12:00 PM | 12:30 | 1:00 |
|---|---|---|---|
| NEWS 201 | Local News | | Local News |
| CNN 202 | America's New War | | |
| ESPN 206 | NBA Inside S... | Auto Racing | |
| TRAV 233 | Places of My... | Incredible Va... | High Class... |
| ETV 236 | Mystery & Sc... | Videofashion! | Talk Soup |
| SCIFI 244 | good vs. evil | | good vs. evil |
| HBO 501 | Meet the Parents PG-13, CC | | |

Fig. 15a

SYSTEM AND METHOD FOR SPECULATIVE TUNING

CROSS-REFERENCE TO RELATED APPLICATION(S)

The present application is a continuation-in-part of U.S. patent application Ser. No. 10/121,561, filed Apr. 11, 2002, for "A SYSTEM AND METHOD FOR SPECULATIVE TUNING", which application is incorporated herein by reference in its entirety.

BACKGROUND OF THE INVENTION

Multimedia receiver systems that employ multiple tuners have become increasingly popular in recent years. Certain types of these receiver systems, such as digital multimedia recorder systems, are capable of digitizing and storing audio and/or video content on hard drives which are currently between 5 and 100 Gbytes in size. Various types of multimedia recorders are available today including personal video recorders ("PVRs"), from companies such as Tivo™ and Sonicblue,™ which are capable of storing several hours of broadcast television programming; and digital music recorders such as the iPod™ from Apple Computer,™ which is capable of storing hundreds of hours of audio content copied from compact discs ("CDs") or downloaded from the Internet.

A prior art PVR system for storing digital video and audio content is illustrated in FIG. 1. As illustrated, one or more tuners 120, 121 are configured to lock on to audio/video signals 100, 101 transmitted at specified carrier frequencies and down-convert the signals to baseband. Demodulators 130, 131 demodulate the baseband signals to extract the underlying digital data. If the audio/video signal is a cable signal, then the demodulators 130, 131 are typically Quadrature Amplitude Modulation ("QAM") demodulators. If the audio/video signal is a satellite signal, then the demodulators 130, 131 are typically Differential Phase Shift Keying ("DPSK") demodulators.

The demodulated signals are then transmitted to conditional access ("CA") subsystems 140, 141 which prevent channels/content from being transmitted on the system which the user does not have the right to receive (e.g., subscription-based content such as HBO or pay-per-view channels). If the CA subsystems 140, 141 allow the user to view a particular channel then multimedia content (i.e., audio and/or video content) from the channel is transmitted over a system bus 151 (via bus interface 150) to a mass storage device 160. An MPEG-2 decoder module 170 coupled to the system bus 151 decodes/decompresses the multimedia content before it is rendered on a multimedia rendering device 135 (e.g., a television).

Prior art PVR systems may also utilize a main memory 126 for storing instructions and data and a central processing unit ("CPU") 125 for executing the instructions and data. For example, the CPU may provide a graphical user interface displayed on the television, allowing the user to select certain television or audio programs for playback and/or storage on the mass storage device 160.

Multi-tuner receiver systems, such as the PVR system illustrated in FIG. 1, may be equipped with two sets of tuners, demodulators and CA subsystems and are therefore capable of concurrently receiving, decoding and, perhaps, storing multimedia content from two independent broadcast channels. In the case of a PVR system, for example, such a configuration is useful for recording one program (e.g., received by the first tuner 120), while watching another program (e.g., received by the second tuner 121). Frequently, however, when a user is simply browsing through channels, one (or more) of the tuners remains unutilized.

Accordingly, what is needed is a digital multimedia receiver system which takes advantage of at least one unused tuner to improve the speed with which the system tunes to selected channels.

BRIEF SUMMARY OF THE INVENTION

This invention relates generally to the field of multimedia receiver systems. More particularly, the invention relates to an apparatus and method for improving the speed at which multimedia receivers tune to selected channels.

BRIEF DESCRIPTION OF SEVERAL VIEWS OF THE DRAWING

A better understanding of the present invention can be obtained from the following detailed description in conjunction with the following drawings, in which:

FIG. 7c illustrates a signal diagram of communication between a home media server and telephone.

FIG. 8b illustrates a potential progression of bandwidth allocation between packet switched channels and analog/digital broadcast channels.

FIG. 9c illustrates bitrate data normalized at one second intervals.

FIGS. 15a and 15b illustrate electronic program guides which may be used in connection with embodiments of the invention.

DETAILED DESCRIPTION OF THE INVENTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Introduction

An advanced digital recorder system (hereinafter "Media Server") is described in the co-pending application entitled MULTIMEDIA AND COMPUTING SYSTEM, U.S. application Ser. No. 09/653,964, filed Sep. 1, 2000, which is assigned to the assignee of the present application and which is incorporated herein by reference. Certain aspects of this system will now be described followed by a detailed description of embodiments of a system for speculative tuning. It should be noted, however, that the underlying principles of the invention may be implemented on virtually any type of multimedia receiver system, including digital multimedia recorder systems, that employ multiple tuners. For example, the speculative tuning techniques described below may be employed on both advanced multimedia recorder systems (e.g., such as a Media Server) and standard PVR systems such as those described above in the background section.

Embodiments of a Media Server

Figure 2A:
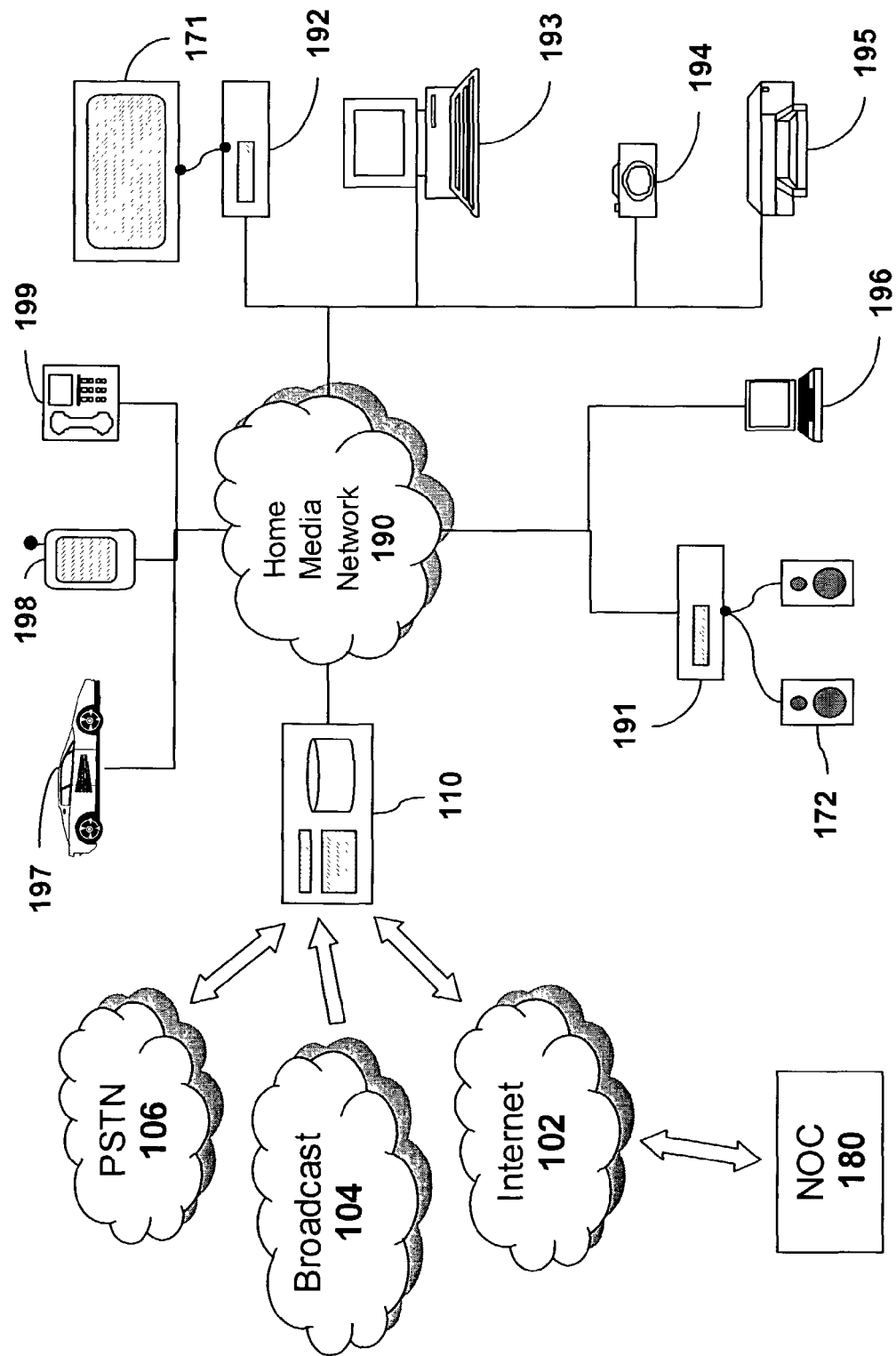
FIG. 2a illustrates network architecture for implementing embodiments of the invention.

As illustrated in FIG. 2a, a digital media server 110 equipped with a processor and a mass storage device acts as a central repository for decoding, storing and distributing multimedia content and data. More particularly, the digital media server 110 (or a plurality of digital media servers 110) coordinates multimedia content from Internet communication channels 102 (e.g., DSL, cable Internet), broadcast communication channels 104 (e.g., digital/analog cable, satellite), and/or Public Switched Telephone Network ("PSTN") communication channels 106 (i.e., standard telephone) to provide a stable, real-time home media network 190 for a plurality of network devices 191-199.

Figure 2B:
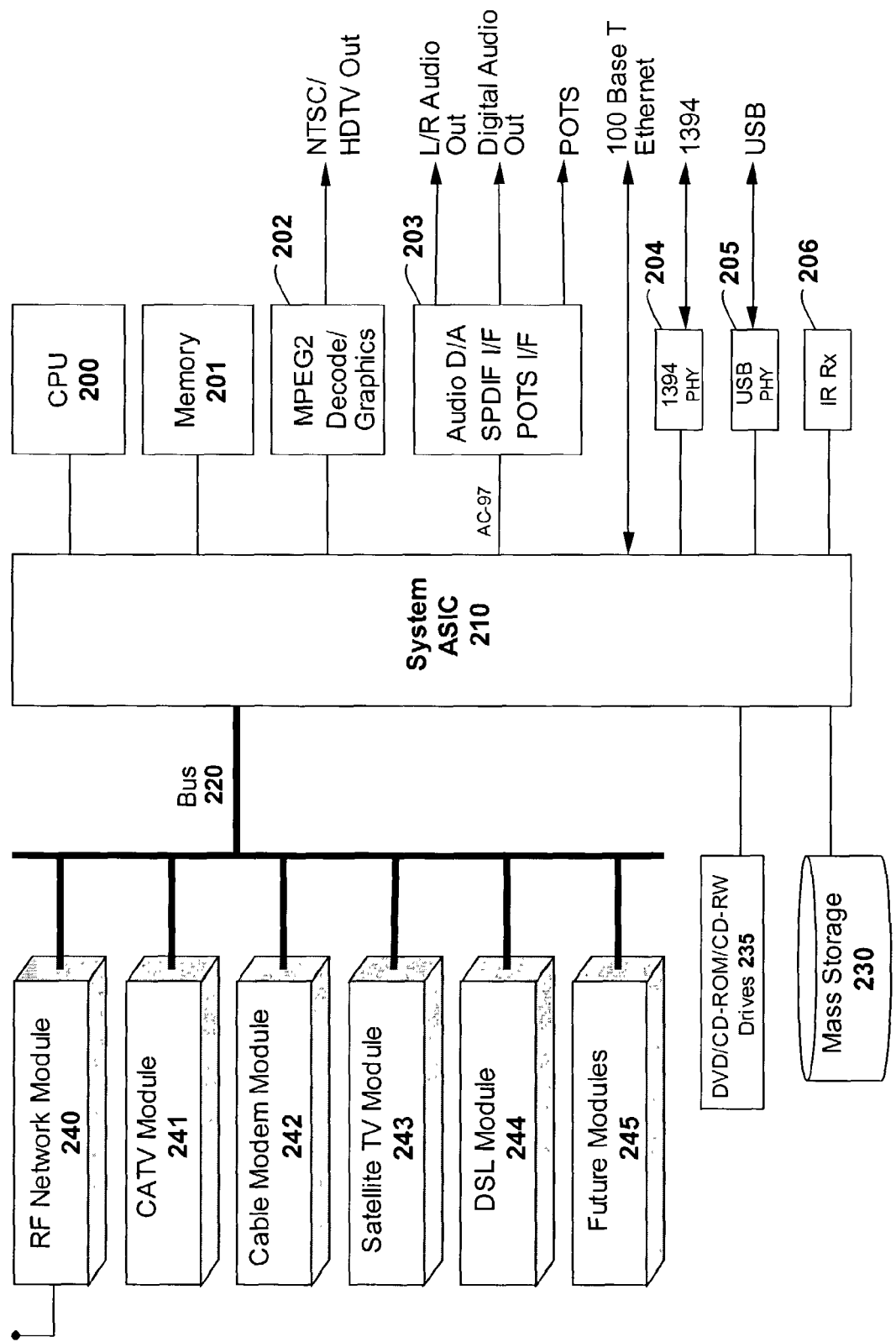
FIG. 2b illustrates one embodiment of a home media server hardware architecture.

As illustrated in FIG. 2b, one embodiment of a home media server 110 computing architecture includes a central processing unit 200 capable of processing data and multimedia content stored in main memory 201 and a mass storage device 230 for storing data and multimedia content. In one embodiment, the central processing unit 200 is a Pentium®-class processor such as a Pentium III® operating at a 1 GHz or faster clock frequency. It should be noted, however, that the underlying principles of the invention are not limited to any particular processor speed or processor type. The main memory 201 may be a random access memory or any other dynamic storage medium (e.g., SDRAM, DDRAM, RD-RAM, . . . etc). The mass storage device 230 of one embodiment is capable of storing hundreds, or even thousands of hours of multimedia content (e.g., movies, digital audio, . . . etc) as well as other types of digital data (e.g., computer programs, word processing documents, . . . etc). Devices transmit and receive data to/from the mass storage device 230 over a high speed interface such as an enhanced IDE interface with Ultra DMA capabilities or a Small Computer System Interface ("SCSI"). However, various other interfaces may be employed while still complying with the underlying principles of the invention.

An application-specific integrated circuit ("ASIC") 210 coordinates communication between the various system components and offloads certain designated processing tasks from the CPU. The ASIC may be custom built based on the requirements of the home media server 110 or may be built using gate arrays, standard cells or programmable logic devices.

Communication modules 240-245 electrically coupled to the home media server 110 via a system bus 220, allow the home media server 110 to communicate over different local and remote communication channels. In one embodiment, the system bus 220 is a peripheral component interconnect ("PCI") bus, although various other bus types may be configured within the home media server 110 (e.g., ISA, EISA, Micro Channel, VL-bus . . . etc).

In the particular embodiment illustrated in FIG. 2b, the communication modules 240-245 electrically coupled to the system bus 220 include an RF network module 240 for communicating over the home media network 190 (i.e., via a wireless RF channel), a cable TV module 241 for receiving broadcast cable channels, a cable modem module 242 for providing Internet access via a cable system (i.e., using the TCP/IP protocol), a satellite TV module 243 for receiving satellite broadcasts, and a DSL module 244 for DSL Internet access. Moreover, a virtually unlimited number of new modules may be added as necessary to support new or existing communication channels/protocols (as indicated by module 245).

Other components within the home media server 110 architecture include an MPEG-2 decode module 202 (and/or other decode modules such as AC3, MPEG-1, . . . etc); an audio module 203 comprised of a digital-to-analog converter, a Sony-Philips Digital Interconnect Format ("SPDIF") interface and a standard telephony interface for providing digital and analog audio and standard telephone service to external audio/telephony devices; an Ethernet port provided directly the system ASIC 210 (as indicated by the "100 Base-T Ethernet" designation); a Firewire (IEEE 1394) port 204; a Universal Serial Bus ("USB") port 205; and an infrared port 206. Various other communication interfaces may be configured in the system, either directly on the primary home media server architecture 110 (e.g., on the media server 110 "motherboard"), or as an add-on module 240-245. Moreover, the communication modules (e.g., 202-206), the CPU 200 and/or the memory 201 may be incorporated within the system ASIC 210, rather than as separate modules as illustrated in FIG. 2b.

Embodiments of the home media server 110 may also be equipped with a DVD drive, CD player, CD Read-Write drive, recordable DVD drive (as described in greater detail below), and/or any other type of portable storage medium 235. In one embodiment, these devices may communicate with the home media server 110 via an AT Attachment Packet Interface ("ATAPI"), although the type of interface used is not pertinent to the underlying principles of the invention.

Figure 2C:
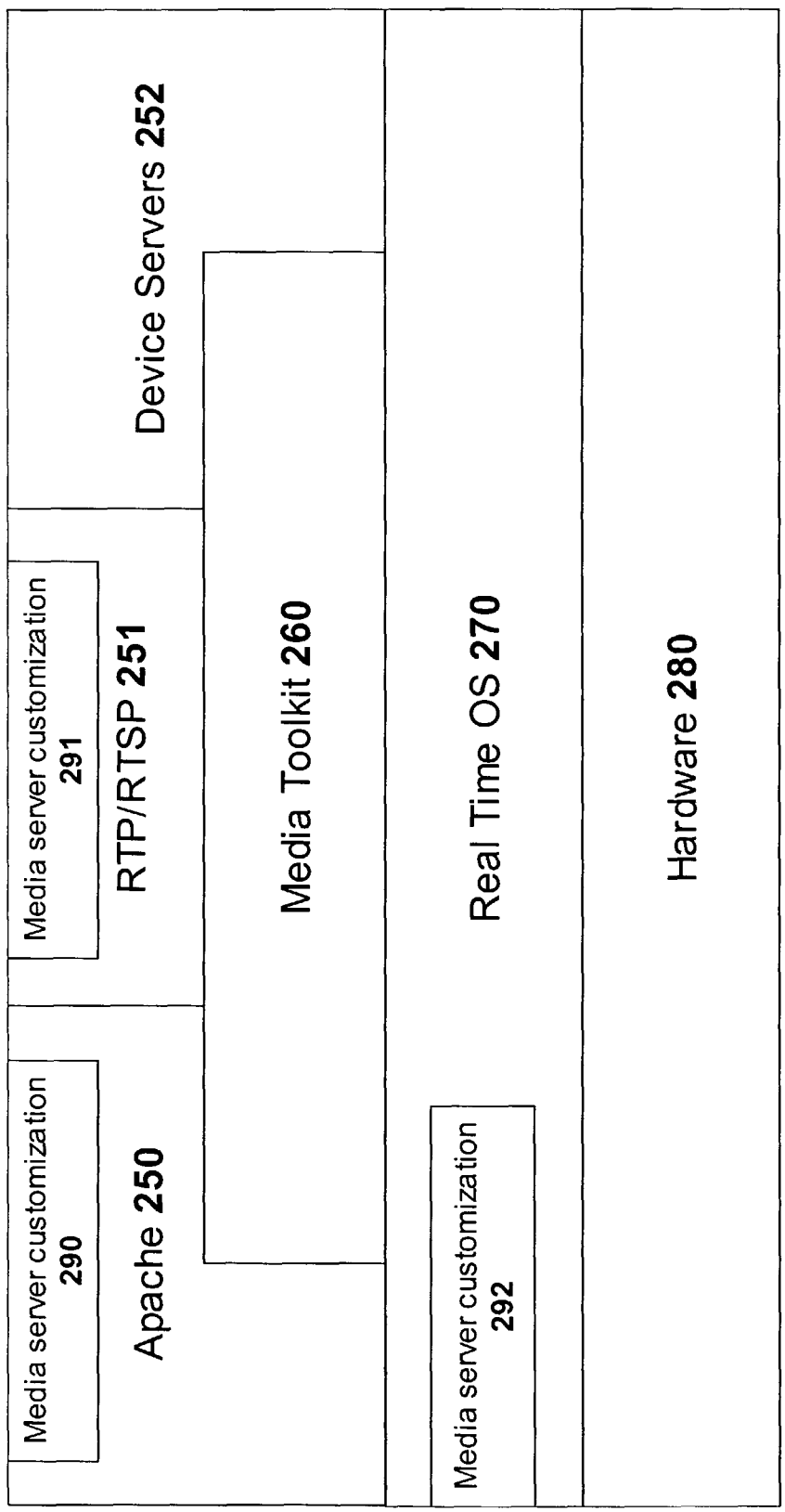
FIG. 2c illustrates one embodiment of a home media server software architecture.

FIG. 2c illustrates a software architecture employed in one embodiment of the home media server 110. Different hardware architectures 280 may be used to support the software, including the hardware architecture illustrated in FIG. 2b. A multitasking, multithreaded operating system ("OS") 270 (e.g., Linux, UNIX, Windows NT®) with real time streaming support is executed on the hardware 280. In one embodiment, certain proprietary customizations 292 are programmed in the media server OS 270 including, for example, real time services for streaming audio and video (real time OSs typically do not include these features).

A media toolkit 260 executed within the home media server 110 provides an application programming interface ("API") for the different media server 110 applications described herein as well as a set of media server 110 utilities. In one embodiment, a minimum quality of service ("QoS") is defined within the media toolkit 260. The media toolkit 110 may be comprised of several functional layers including a media stream abstraction layer; a media stream resource management layer; a security/conditional access layer; and a transport/storage abstraction layer.

In one embodiment, the home media server 110 is configured with support for the realtime transport protocol ("RTP") and the realtime streaming protocol ("RTSP") (see, e.g., RTP/RTSP module 251). Briefly, RTP is an IP protocol which supports real time transmission of voice and video. An RTP packet typically resides on top of a user datagram protocol ("UDP") and includes timestamping and synchronization information in its header for proper reassembly at the receiving end. RTSP is a well known protocol for streaming multimedia content over a network. It should be noted, however, that various other streaming protocols may be implemented while still complying with the underlying principles of the invention (e.g., Quicktime®, Windows Media, . . . etc).

RTP and RTSP were designed primarily for PC to PC communication over non-realtime networks. Accordingly, because one embodiment of the home media server 110 operates over a realtime home media network 190 and communicates to devices other than PCs, certain optimizations 290 may be programmed within the RTP/RTSP component 251. These include, for example, support for multiple data streams between the home media server 110 and the various multimedia devices 191-199 (e.g., one or more video streams and several audio streams)

Apache HTTP server support 250, or other suitable HTTP server support such as Microsoft® Internet Information Server, is also included in one embodiment of the home media server 110. Apache is an open-source HTTP server software product which may be executed on various modern desktop and server operating systems. Once again, certain media server customizations 290 may be included within the Apache component 250, further refining HTTP support for the home media network 190 environment.

In one embodiment, a plurality of device servers 252 are executed on the home media server 110. These devices servers provide application support for each of the media nodes 191-192 and other devices 193-199 communicating with the home media server 110 over the home media network 190. For example, in response to a "tune" command sent from a media node 191, a tuning device server will cause the home media server to tune to a broadcast channel specified by the tune command. The tuning server may also include conditional access functionality (i.e., only allowing tuning to occur for channels to which the user has access rights).

Although described above as a "software" architecture, it should be noted that various elements illustrated in FIG. 2c may also be implemented in firmware and/or hardware while still complying the underlying principles of the invention.

Referring again to FIG. 2a, numerous digital and analog devices may be configured to communicate with the home media server 110 over the home media network 190 and thus function as multimedia nodes. By way of example, and not limitation, these multimedia nodes include set-top boxes 192, personal computers 193, cameras or digital camcorders 194, printers 195, notebook computers 196, automotive audio/video systems 197, cell phones or personal digital assistants 198, standard telephones 199 (including fax machines), home security systems (not shown); and/or home climate control systems (not shown).

In one embodiment, complex multimedia and data processing such as tuning to selected channels, recording of specified programs/music, storing phone numbers and personal data, connecting to remote network sites, etc., is performed at the media server 110, rather than at the individual network devices 191-199. As such, these devices may be manufactured relatively inexpensively. For example, multimedia nodes 191-199 may be equipped with just enough processing power and memory to receive and play back a multimedia signal, with storage and control (e.g., tuning) functions offloaded to the home media server 110. Similarly, a telephone 199 may be designed with nothing more than a low power microcontroller coupled to an RF transmitter, with telephony functions and contact data storage provided by the home media server 110. In addition, because these network devices 191-199 do not require as much circuitry, they will be lighter than currently-existing devices, and will consume less power.

In one embodiment, the primary communication medium over which the home media server 110 and the various devices 191-199 communicate is wireless RF (e.g., via network module 240), with terrestrial transport connections such as Ethernet reserved for devices which are not within RF transmission range. Moreover, certain devices which require a substantial amount of home media network 190 bandwidth (e.g., high definition television 171), and/or devices which are in close proximity to the media server 110 may be configured to communicate over terrestrial transports, depending on the requirements of the particular configuration.

One Embodiment of a Multimedia Node Architecture

Distributed multimedia nodes 191 and 192 illustrated in FIG. 2a provide an interface to the home media network 190 for audio systems 172 (e.g., audio amplifiers and speakers) and/or video systems 171 (e.g., standard television sets, wide screen television sets, high definition television ("HDTV") sets, or any other device capable of displaying video).

As illustrated in FIG. 6, one particular embodiment of a multimedia node architecture (see, e.g., node 191 in FIG. 2a), is comprised of a network interface 605 coupled to the multimedia node bus 610 (e.g., a PCI bus); a system ASIC 620, including MPEG-2 decode/graphics logic 630 (or other multimedia decode logic); a central processing unit 640 and memory 650; an audio processing unit 660; and/or an infrared port 670.

The local central processing unit 640 and memory 650 execute programs and process data locally (i.e., at the multimedia nodes 191, 192). The network interface 605, which may be an RF interface or a terrestrial interface (e.g., Ethernet), receives/transmits multimedia content and control data from/to the home media server 110 over the home media network 190. The system ASIC 620 decodes and processes incoming multimedia content transmitted from the home media server 110 via MPEG-2 decode/graphics logic 630 (or other multimedia compression standard) to produce one or more video outputs 680 (e.g., an NTSC output, an HDTV output, . . . etc). In one embodiment, a separate audio processing unit 660 produces both digital and analog audio outputs, 681 and 682, respectively. Moreover, one embodiment also includes a local mass storage device (not shown) for storing certain multimedia content and/or data (e.g., frequently-requested content/data).

In one embodiment, the local infrared interface 670 receives control commands from a remote control unit (e.g., unit 532 in FIG. 5) operated by a user. As described below with reference to FIG. 5, control data/commands received through the infrared interface 670 may subsequently be transmitted to the home media server 110 for processing. For example, in one embodiment, if a user selects a command to change to a live broadcast channel (e.g., the evening news), the command is transmitted from multimedia node 192 to a home media server 110 10 tuning application, which forwards the command to a video module (e.g., CATV module 241, satellite TV module 243). The tuner in the video module (see, e.g., tuner 1010 in FIG. 10) then tunes to the requested frequency and the new video signal is streamed from the home media server 110 to the multimedia node 192. Alternatively, or in addition, if the requested content was previously stored on the home media server 110 (e.g., on mass storage device 230), then no broadcast tuning is necessary—the content is simply read from the storage device 230 and transmitted to the multimedia node 191. Accordingly, as described in greater detail below, the amount of audio/video content which must be broadcast to the home media server 110 (i.e., over dedicated broadcast channels) is significantly reduced.

Figure 6A:
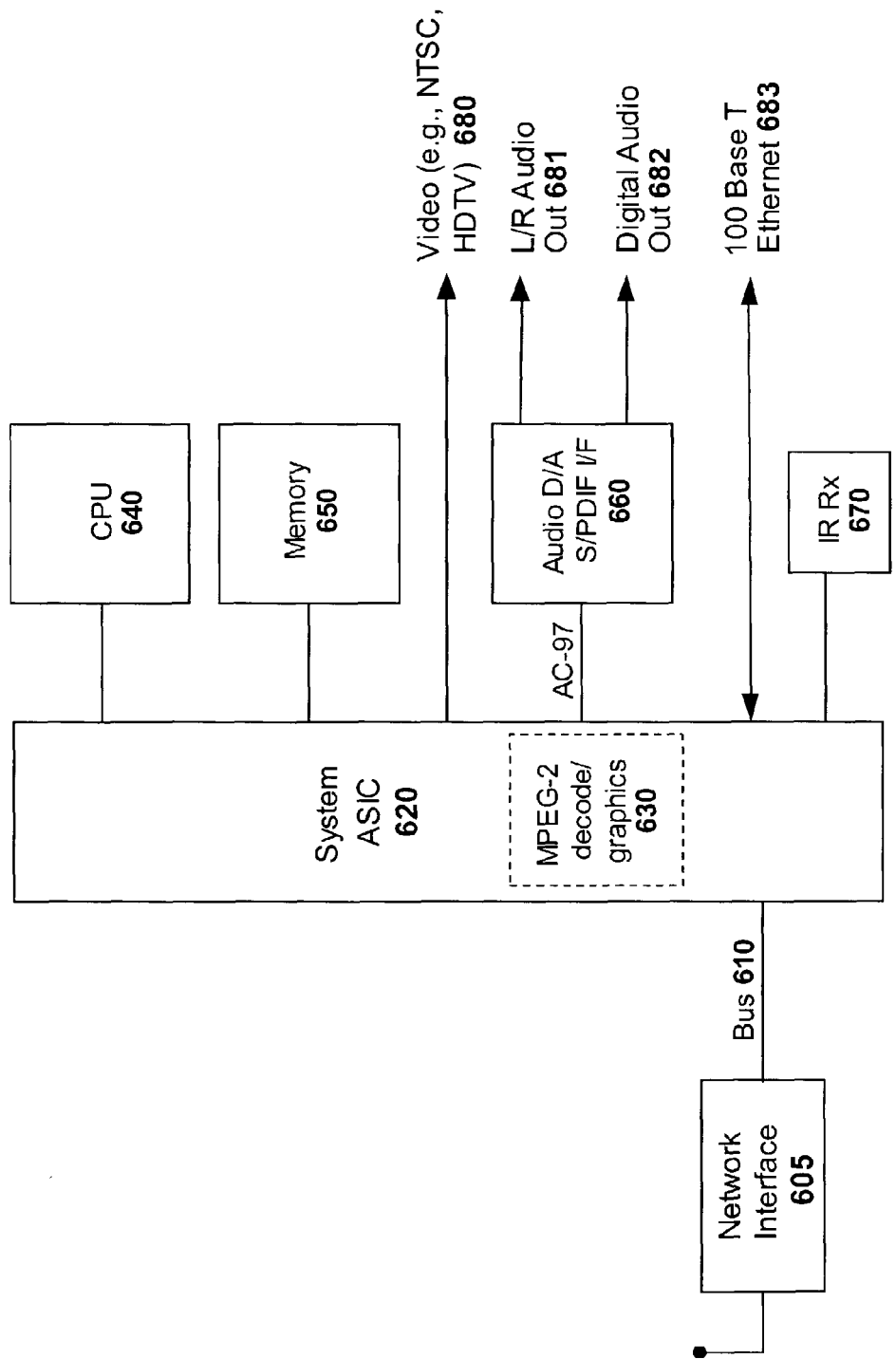
FIG. 6a illustrates one embodiment of a multimedia node hardware architecture.
Figure 6B:
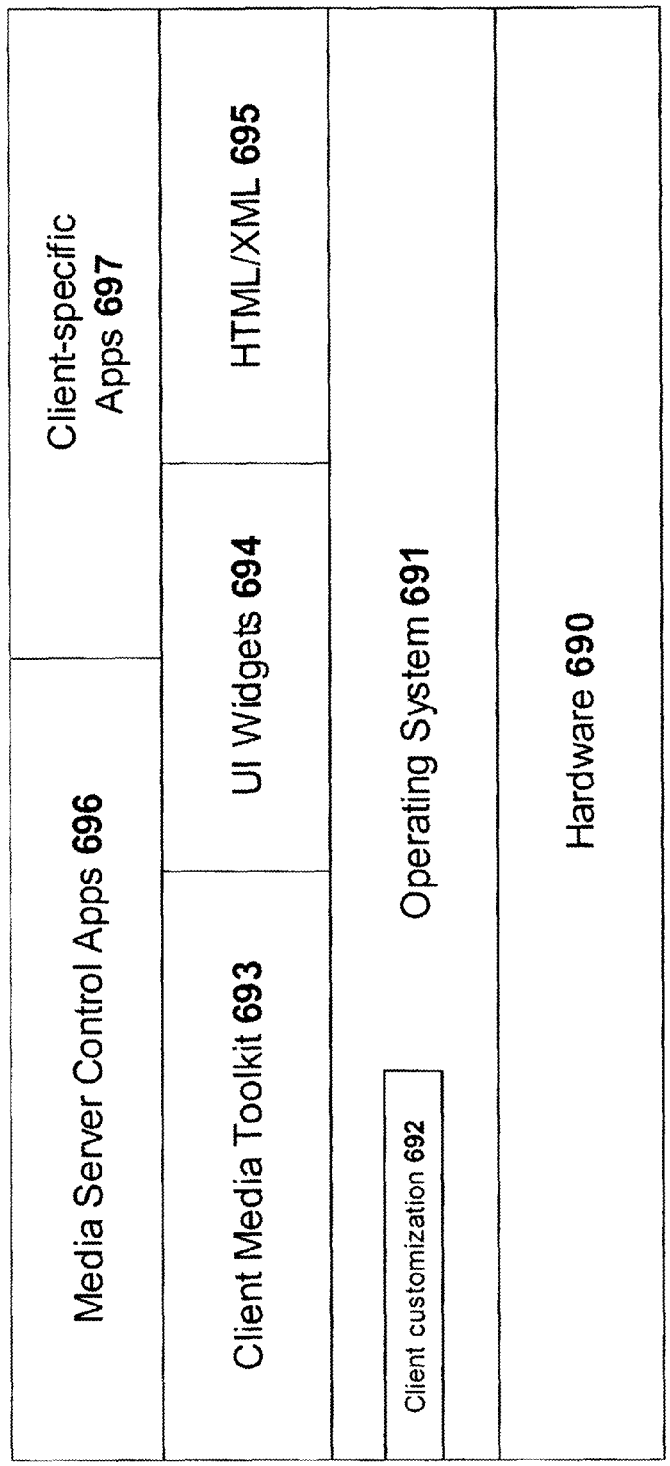
FIG. 6b illustrates one embodiment of a multimedia node software architecture.

One embodiment of a multimedia node 191 software architecture is illustrated in FIG. 6b. Various hardware architectures 690 may be used to support the software architecture, including the architecture illustrated in FIG. 6a. An operating system 691 executed on hardware 690 (e.g., Windows '98, Linux, . . . etc) includes client customizations for optimizing communication over the home media network 190 (e.g., providing low level support for real time streaming of audio and video).

A standard set of user interface components 694 included in one embodiment may be employed (e.g., by application developers) to generate unique interactive interfaces at each of the media nodes 191, 192. For example, a user-navigable tuning index may be included which lists available content by dates/times and allows users to graphically select a particular broadcast channel and/or stored content from the mass storage device 230.

In addition, support for the hypertext markup language ("HTML") and/or the extensible markup language ("XML") are included in one multimedia node 191 embodiment, allowing users to download, view and modify various types of Internet content (e.g., Web pages).

Applications executed on multimedia nodes 191, 192 may include client-specific applications 697 and/or home media server 110 control applications 696. Two examples of media server control application 696 will now be described with reference to FIGS. 6c-6d. It should be noted, however, that these examples are for the purpose of illustration only and should not be read to limit the scope of the invention.

Figure 6C:
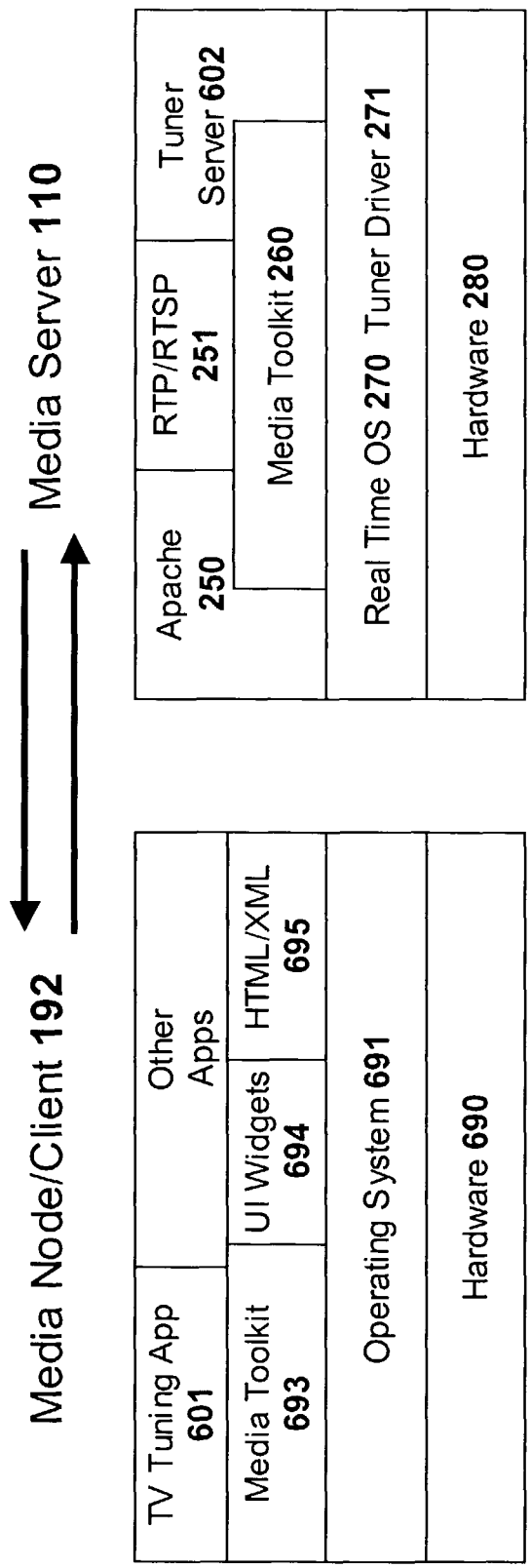
FIG. 6c illustrates one embodiment of the system for tuning between multimedia channels.

FIG. 6c illustrates an embodiment for tuning to a particular broadcast channel (e.g., cable, satellite broadcast). A user initially selects a particular channel (e.g., via a remote control device) to be viewed at the local multimedia node 192. The command is received by the local TV tuning application 601 executed on the multimedia node 192, which sends a tuning request to the home media server 110 over the home media network 190. A tuner server module 602 executed on the home media server 110 receives the request and forwards the request to the tuner driver 271 (e.g., through the media toolkit 260). In response to the command, the tuner driver 271 directs the tuner hardware (see, e.g., tuner 1010 in FIG. 10 described below) to tune to the specified channel. The tuner driver also communicates with the conditional access subsystem (see, e.g., module 1030 in FIG. 10) to determine whether the user has the right to view the particular channel (e.g., the channel may be a subscription-based channel such as HBO).

If the user has access rights, then the tuner server module 252 creates video stream for the specified broadcast channel and feeds the stream to the multimedia node 192. In one embodiment, the tuner server module 602 creates the stream using the RTP/RTSP protocol (i.e., by communicating with the RTP/RTSP module 251). The media node receives the stream through the local TV tuning application 601 and decodes the stream using a codec embedded within the media toolkit 260 (various additional encoding features of the system are set forth below). Once decoded, the video image is generated on the video display.

Figure 6D:
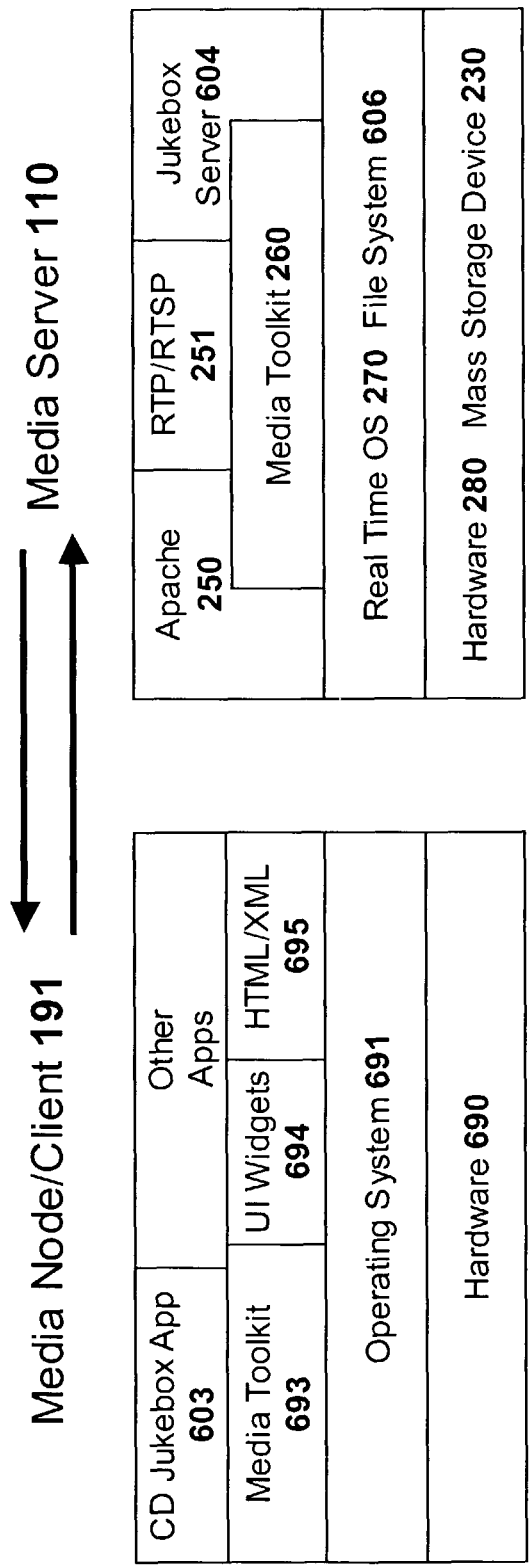
FIG. 6d illustrates one embodiment of the system for playing a CD jukebox.

FIG. 6d illustrates an embodiment for employing a music jukebox at a multimedia node 191. A user initially selects a particular music play list (e.g., via a remote control device) to be played at the multimedia node 191. The request is received by a music jukebox application 603 executed on the multimedia node 191, which forwards the request to the home media server 110. A jukebox server module 604 executed on the home media server 110 receives the request and forwards the request to the media server file system 606 (through the media toolkit 260), which retrieves the music files from the mass storage device 230. The jukebox server module 604 then creates the audio stream for the specified files and feeds the stream to the multimedia node 191. In one embodiment, the tuner server module 252 uses the RTP/RTSP protocol to create the stream (e.g., through communication with the RTP/RTSP module 251). The multimedia node 191 receives the stream through its jukebox application 601 and decodes the stream using a codec embedded within the media toolkit 260. Once decoded, the music tracks are reproduced on a set of speakers.

Network Operations Center

In one embodiment, a network operation center ("NOC") 180 illustrated in FIG. 2a provides data and multimedia services for the home media server 110. The NOC may be comprised of one or more servers communicating with the home media server 110 over the Internet 120 (or other network). In one embodiment, the NOC performs one or more of the following functions:

Remote Monitoring and Maintenance. The NOC 180 monitors the home media server to ensure that it is operating within normal parameters. In one embodiment, the home media server 110 periodically transmits a status update to the NOC 180, indicating whether any particular services are required and/or whether any problems have arisen. If the home media server 110 fails to transmit a status update after a predetermined period of time, the NOC 180 may take steps to determine the cause of the problem and/or take steps to contact the user. For example, diagnostic tests may be performed to evaluate the network connection between the home media server 110 and the NOC 180. If the diagnostic tests do not provide an answer, then the user may be contacted via telephone to determine the next course of action. In one embodiment the NOC 180 is staffed by engineers or other technical assistance personnel 24-hours a day.

In one embodiment, the user's home security system and/or fire system communicates with the home media server 110 over the home media network 190. Accordingly, the home media server 110 may be programmed to relay home security and/or fire system data to the NOC 180 on a periodic basis during certain periods of time (e.g., every minute). If a security problem or fire trouble to indication is encountered during this period of time (e.g., a door/window is opened without the proper security access code), the NOC 180 may notify a local law enforcement agency and/or the local fire department.

Automatic Downloading and Upgrades. In one embodiment, the NOC 180 provides automated software downloading and upgrades to the home media server 110. For example, when a new software interface/program (e.g., a new graphical user interface) is developed for the home media server 110 it may be automatically downloaded from the NOC 180 and installed. Whether the NOC 180 should upgrade software on the home media server 110 automatically may be determined by each individual user. Certain users may opt to manually upgrade all of their software while other users may specify a particular subset of software to be automatically upgraded. For example, a user may specify automatic upgrades for graphical user interface software and manual upgrades for email clients and word processors.

In addition, the NOC 180 may store up-to-date drivers for various home media network devices 160-166. In one embodiment, when a user purchases a new device, such as a new telephone, the device may automatically identify itself to the home media server 110 (e.g., via USB, IEEE 1394 or other device identification technology). The home media server 110 will then determine whether the device is supported by the system and, if so, query the NOC 180 for the latest driver. In one embodiment, once the driver is identified, it is automatically downloaded from the NOC 180 and installed on the home media server 110. Once installed, the driver may be updated automatically as new updates become available. Accordingly, driver software will no longer need to be bundled with home network devices 160-166, resulting an additional cost savings to the end-user. In addition, users will not be required to install and configure device drivers for each new network device they purchase.

In addition, the home media server 110 may check the NOC 180 to determine whether the home network device has been certified by the NOC 180 as meeting some minimum level of quality and/or performance. In one embodiment, device drivers will be downloaded and installed on the system only if the device has been certified. In this manner, a minimum quality of service may be maintained for all devices employed on the system.

The same type of device identification, certification, and driver installation may be performed for communication modules 240-245 such as those described above. Thus, as with home network devices 160-166, certain communication modules 240-245 which do not meet a minimum quality of service requirement (e.g., those which perform inefficient bus transactions which tie up the system bus 220) will not be certified by the NOC 180 and will not be permitted to be installed in the home media server 110.

In addition, in one embodiment the communication modules 240-245 are manufactured and certified by third party content providers (e.g., satellite broadcast operators). In this embodiment, the content providers may configure the modules 240-245 to work with their own proprietary communication protocols, encryption techniques, and/or application programs. For example, DirecTV™ may develop a proprietary interface for its users so that when a user selects his DirecTV feed he will be presented with a unique user interface and/or channel programming environment. Accordingly, while the present invention provides a standard media transport interface for a variety of different communication channels, service providers can still distinguish their services based on the proprietary applications/transports which they develop.

Logging/Data Warehousing. In one embodiment, the NOC 180 may perform logging and data warehousing for the home media server 110. More specifically, the NOC 180 may maintain a log of network transactions for each home media server 110 and subsequently evaluate the log for a variety of reasons (e.g., to troubleshoot system problems, to determine a user's preferences and tailor services and/or advertising to that user, . . . etc). For example, by monitoring usage patterns, the NOC 180 may determine that every time a certain Java applet is downloaded, the home media server 110 crashes. As such, the NOC 180 may takes steps to ensure that the applet in question is no longer downloaded by the home media server 110 (e.g., by notifying the user or automatically blocking the applet). The NOC 180 could then notify the technical support staff to determine the problem with the applet.

Similarly, the usage log may be evaluated to determine the preferences of a user and to provide specialized services to that user based on those preferences. For example, based on the Web sites the user visits and/or the channels that the user watches, the NOC 180 may determine that the user is interested in baseball. As such, the NOC 180 may automatically provide baseball-related content to the user such as, for example, broadcast schedules for upcoming games, a subscription offer to a sports magazine, advertisements, and various other baseball-related content. Similarly, the NOC 180 may determine that the user watches certain television shows on a regular basis, and may automatically download/record those shows on the home media server 110 (e.g., via TCP/IP), so that they will be readily available for the user (e.g., during non-broadcast periods of time).

Archiving. In one embodiment, users may backup multimedia content and other types of data at the NOC 180. For example, a user may take a series of pictures with a digital camera and transmit the originals to the NOC 180 for developing. In one embodiment, the NOC will transmit the pictures to a developer on behalf of the user and will store a backup copy of each of the originals (the NOC 180 will be backed up regularly to prevent loss of the originals).

In one embodiment, the NOC 180 will monitor all multimedia content purchased by the user over the Internet. For example, when the user downloads a new compact disk ("CD") from a music download site, the NOC 180 will record the transaction in the user's profile. As such, the user does not need to store all of his/her multimedia content locally on the home media server 110. Rather, because the NOC 180 keeps track of all the content to which the user has access rights, the user can offload storage to the NOC 180 and re-download the content when necessary (e.g., following a hard drive failure on the home media server 110).

Registration/configuration. In one embodiment, users may be required to register with the NOC 180 upon purchasing a home media server 110 and related network devices 191-199. The NOC 180 may prompt each user to respond to a series of question directed to the user's preferences, the type/level of NOC 180 10 services desired by the user, the authorization level of each user in the home media server 110 household (e.g., children may be provided with limited limited functionality), and any other user-related data which may aid the NOC 180 in providing user services. In one embodiment, the NOC 180 will automatically detect the home media server 110 configuration and store this data in a user database (e.g., to be used for software upgrades, troubleshooting, . . . etc).

Bridge to Satellite/Cable Operations. In one embodiment, the NOC 180 will coordinate communication between the home media server 110 and any satellite/cable services to which the user has subscribed. For example, the NOC 180 may forward pay-per-view requests transmitted from the home media server 110 to the various cable/satellite operators, and perform the back-end processing (e.g., authentication, billing) required for the pay-per-view transaction. Because a persistent communication channel exists between the NOC 180 and the home media server 110 (e.g., through DSL or cable modem), no dial-up processing is required (unlike current pay-per-view cable and satellite systems).

E-commerce Support. In one embodiment, rather than acting merely as a conduit between the home media server 110 and other e-commerce Internet sites, the NOC 180 may perform various e-commerce functions itself. For example, the NOC 180 may market and sell products on behalf of other online retailers (e.g., Amazon.com®). The NOC 180 of this embodiment may perform the back-end processing (e.g., billing and record keeping) required for each e-commerce transaction.

Application Support. In one embodiment, the NOC 180 will provide support for applications executed on the home media server 110. For example, the NOC 180 may provide a compact disk database containing CD titles, track information, CD serial numbers, etc. When a user copies his CDs onto the mass storage device 230 of the home media server 110, the home media server 110 may query the database (as described in greater detail below) and download title and track information (or other information) used to identify/index each CD and each track. In one embodiment, public CD databases (e.g., such as the database maintained at "www.cddb.com") may be filtered and improved by the NOC 180 to remove errors. Various other types of application support may be implemented at the NOC 180 consistent with the underlying principles of the invention.

Remote-Access Gateway. In one embodiment, the NOC 180 may be used as a gateway to access to the home media server 110 from a remote location.

For example, a user from a PC connected to the Internet may log in to his home is media server 110 through the NOC 180.

In one embodiment, the home media server 110 is configured to make outgoing connections only (i.e., to reject direct incoming connections). As described briefly above, the home media server 110 may poll the NOC 180 periodically (e.g., every few seconds) and transmit a status update. During this periodic poll the home media server 110 may query the NOC 180 to determine whether anyone is attempting to access the home media server 110 from a remote location. If so, then the NOC 180 transmits specific information related to the connection attempt to the home media server 110 (e.g., authentication data such as user ID's, passwords, . . . etc). The home media server 110 may then initiate a connection with the remote user (e.g., using the remote user's IP address and encryption key).

In one particular embodiment, the NOC 180 will authenticate the remote user before notifying the home media server 110 of the connection attempt. For example, upon receipt of a remote connection request, the NOC 180 may prompt the user to answer a series of questions (e.g., personal questions, questions related to the user's account, . . . etc). If the user does not answer the questions in a satisfactory manner, a member of the NOC staff may contact the user directly (e.g., via standard telephone or IP telephone). Regardless of how authentication takes place, once a remote user is authenticated, the user's data is transmitted to the home media server 110, which subsequently establishes a connection with the remote user.

Additional Home Media Server Embodiments and Applications

Figure 3:
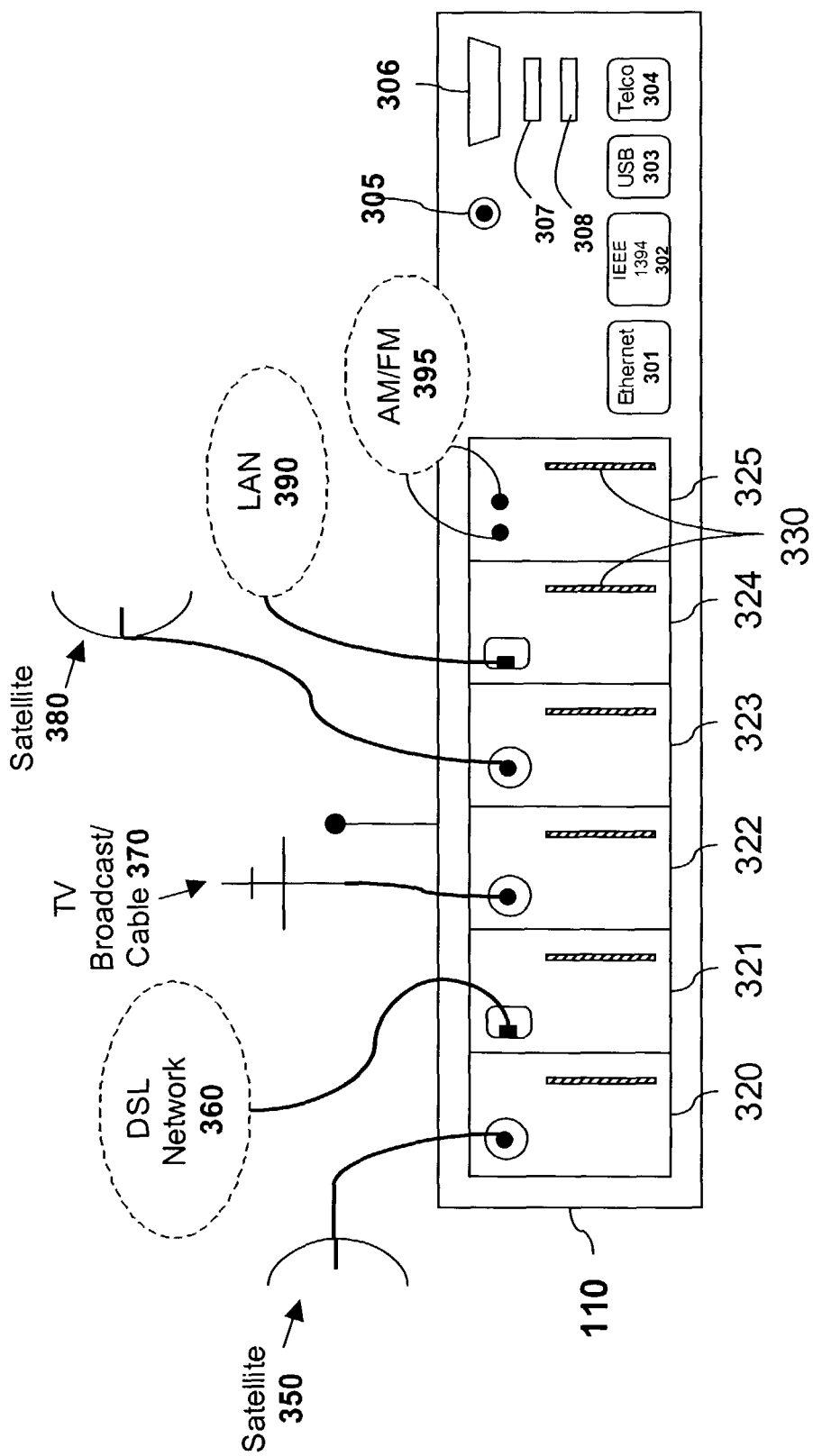
FIG. 3 illustrates a plurality of media modules installed in one embodiment of a home media server.
Figure 4:
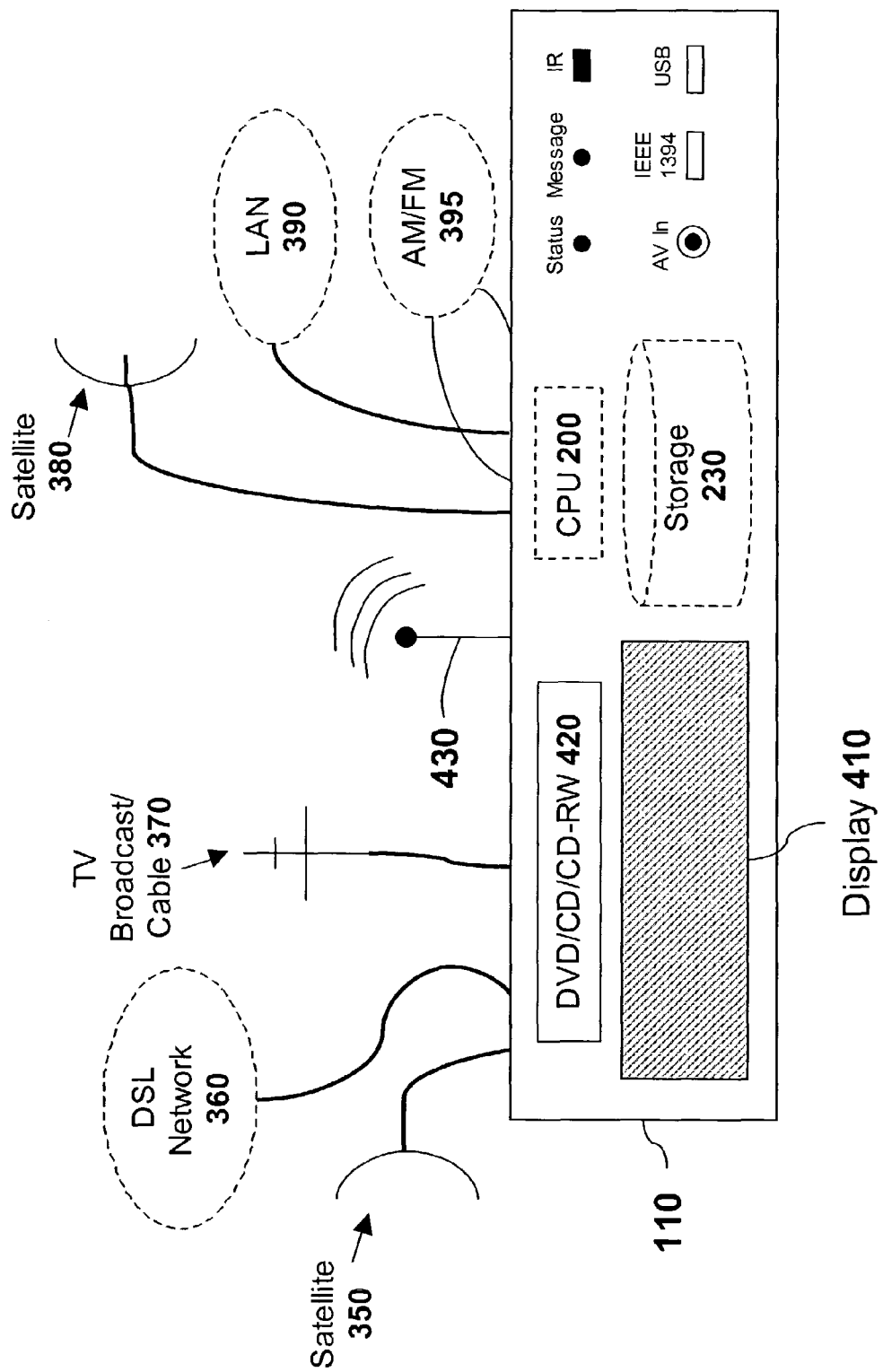
FIG. 4 illustrates one embodiment of a home media server which includes a DVD/CD/CD-RW drive.

An external illustration of one embodiment of the home media server 110 is shown in FIGS. 3 and 4 (from the back and front, respectfully). FIG. 3 shows a home media server 110 with a plurality of different media modules 320-325 installed in its expansion bays (i.e., electrically coupled to its system bus 220). As illustrated, in one embodiment, certain standard communication ports such as Ethernet 301, IEEE 1394 302, USB 303, digital/analog audio 305, standard telephone 304, XGA/HDTV 306, and/or other standard audio/video ports (e.g., AV output ports 307 and 308) may be installed directly in the primary home media server, rather than as an expansion card.

As illustrated in FIG. 4, one embodiment of the system includes a DVD player 420 (and/or a CD player, CD-ReWritable drive, recordable DVD drive or other type of portable digital media player/recorder). The DVD player 420 is capable of playing a DVD directly and/or transferring multimedia content from the DVD to the mass storage device 230. In one embodiment, as multimedia content is transferred to the storage device 230, either from the DVD player 420 or over the Internet 120, an indexing module executed on the home media server 110 indexes the multimedia content in a content database (not shown).

Various DVD/CD identification techniques may be used to identify the particular DVD/CD inserted and copied to the storage device 230. For example, a checksum may be calculated for a known unique portion of the DVD/CD and compared with a CD/DVD checksum database (e.g., maintained at the NOC 180 or other server). Similarly, the serial number may be read from the DVD/CD and compared with a database of DVD/CD serial numbers. Additional DVD/CD identification techniques which may be utilized in accordance with the principles of the invention are disclosed in co-pending applications entitled SYSTEM AND METHOD FOR SCALING A VIDEO SIGNAL, U.S. application Ser. No. 09/632,458, filed Aug. 4, 2000 which is assigned to the assignee of the present application and which is incorporated herein by reference.

In one embodiment of the system, the storage device 230 (e.g., a hard drive) is preferably large enough to store hundreds of hours of video and/or audio content, as well as a variety of other digital information such as telephone voice messages, computer programs/data . . . etc. The current recommended size for the storage device 230 is at least 80 gigabytes, however the particular size of the storage device is not pertinent to the underlying principles of the invention.

One or more RF transmitters 430 are also provided in one embodiment of the home media server 110. The transmitter 430 (as well as the LAN 390, if one is installed) allows the home media server 110 to simultaneously transmit multimedia content and other types of data to the various media devices 191-192, 160-166 over the home media network 190 (e.g., at least one MPEG-2 video stream and several audio streams).

In one embodiment, the wireless transmission system is capable of handling isochronous multimedia traffic reliably (i.e., without jitter) in a wide range of residential settings. For example, the system must be capable of working in the presence of common residential RF interference such as microwave ovens and cell phones. In one embodiment, these requirements are met through the proper choice of modulation and coding. More specifically, one embodiment employs a modified version of IEEE 802.11b adapted to operate in a real time environment (e.g., using Reed-Solomon forward error-correction and antenna diversity with circular polarization).

Figure 5:
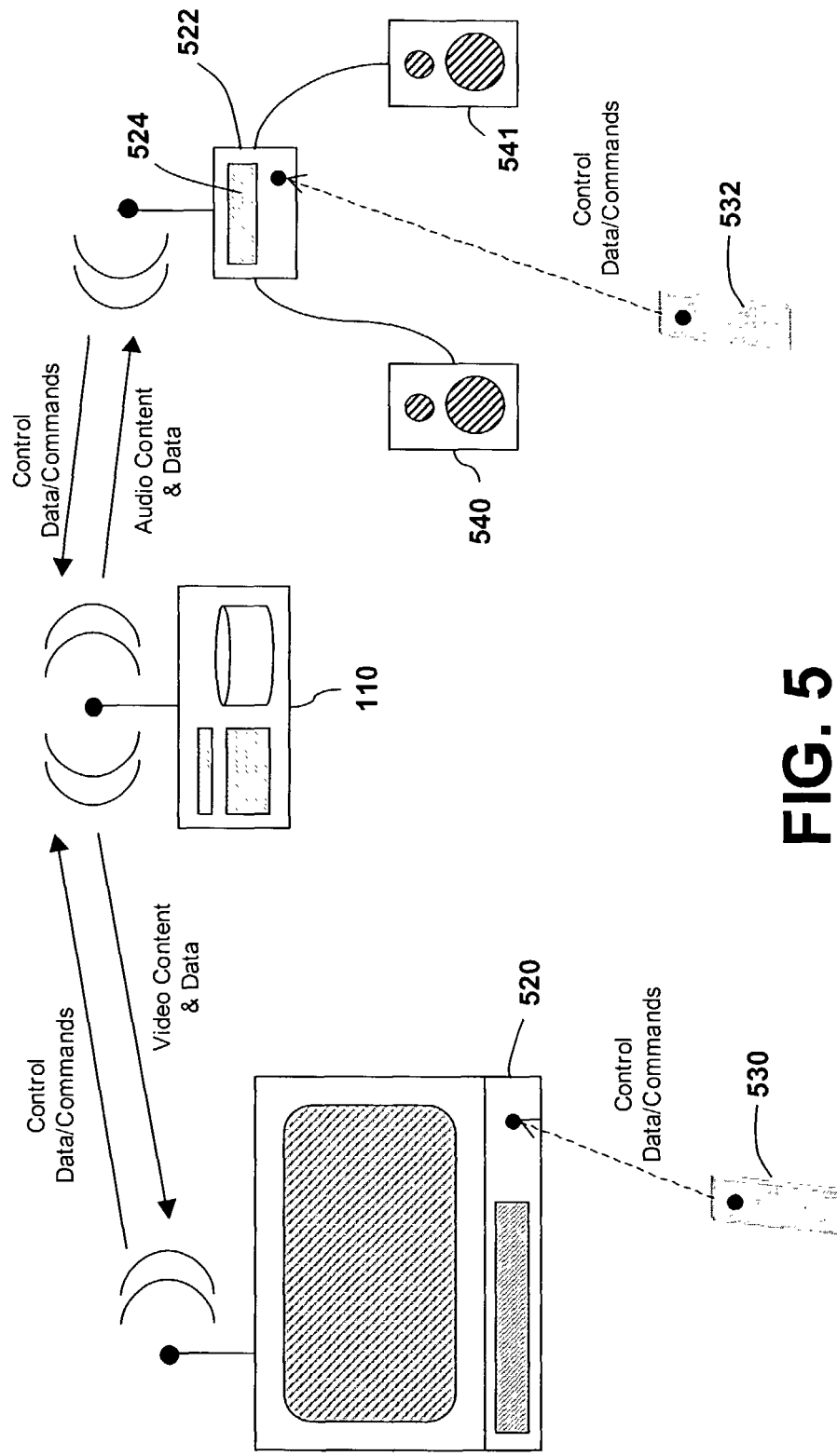
FIG. 5 illustrates a home media server communicating to two audio/video media nodes over a wireless network.

FIG. 5 illustrates a home media server 110 communicating simultaneously with a video node 520 and an audio node 522. Certain multimedia nodes, such as node 522, include an LCD 524 (or other type of display) for displaying information about the multimedia content stored on home media server 110 (e.g., CD and movie titles, CD tracks . . . etc). In one embodiment, the audio node 522 may be electrically coupled to an amplifier for amplifying the transmitted audio signal into a pair of speakers. As described above, in one embodiment, the individual multimedia nodes also include local storage devices (not shown) for locally caching recently used multimedia content and data.

Data/commands sent from remote control devices 530, 532 are transmitted through the nodes 520, 522 to the home/media server 110 as indicated. In one embodiment, the remote control devices include an LCD (not shown) or other type of display for displaying information about the multimedia content stored on home media server 110 (i.e., instead of, or in addition to, the multimedia node 522 display 524).

As described briefly above, using the foregoing system, all of a user's data, music and video may be stored in a single location (i.e., home media server 110) and accessed from anywhere in the house (e.g., stereo node 522) or the car (e.g., via an automotive multimedia node 164 as indicated in FIG. 2a). Moreover, if the home media server 110 is connected to the Internet through, for example, a persistent DSL connection 360, the user can access all of the stored content from various other locations across the globe (e.g., a summer home or a hotel while away on business). One embodiment of the system provides a secure, encrypted data stream when content/data is requested from the home media server 110 in this manner, thereby protecting the user's privacy as well as the copyrights to the underlying multimedia content.

If a multimedia node is employed in a user's automobile as described above, when the automobile is parked within range of the media server's RF transmissions, music or other audio/video content may be transmitted and stored on a storage device within the automobile, even when it is not running. The specific type of audio/video content to be transmitted at a particular time during the day or week may be variable, based on users' preferences. For example, the home media server 110 may be configured to transmit up-to-date traffic reports during the morning and evening hours before the user leaves home/work. The user will then receive an instant traffic report as soon as he starts his car in the morning and/or evening, followed by music or video selected based on the user's preferences. Various additional aspects of this feature are set forth in the co-pending applications incorporated by reference above.

In an embodiment which includes a CD-ReWritable ("CD-RW") drive, users can produce custom CDs using the audio content stored on the mass storage device 230 or downloaded from the Internet. The CD-RW drive may utilize serial copy management techniques to produce CDs which cannot themselves be copied, thereby protecting the copyrights to the underlying works. Moreover, in one embodiment, the system will determine whether the content owner or content creator allows copying of the multimedia content. For example, certain content creators/owners may allow a copy to be stored on the home media server mass storage device 230, but may not allow copying to a portable disk (e.g., a CD-RW disk). In one embodiment, content stored on the mass storage device 230 may be labeled as non-copyable by setting one or more "copy" bits to a particular value (e.g., in a bit field associated with the content).

In one embodiment of the system, a portable music/video player node may be configured to retrieve multimedia content directly from the home media server 110 or via an adapter module. Portable MP3 players such as the Rio™ from Diamond Multimedia™, for example, may be used to store and play back digital audio content transmitted from the home media server in a flash memory module. In one particular embodiment, the CD-RW drive 420 is capable of accepting the ⅓ inch "mini CD" format. Accordingly, users may produce unique mini CDs (e.g., using tracks stored on the mass storage device 230), for playback on MP-3 players capable of playing mini-CDs.

MPEG conversion logic is configured on one embodiment of the home media server 110 (e.g., in software, hardware or any combination thereof), allowing the home media server 110 to convert from one MPEG format to another. Using the MPEG conversion logic, video content stored in MPEG-2 format may be converted to MPEG-1 format and recorded on a "video CD" (a compact disc format used to hold full-motion MPEG-1 video). As such, users may store video on a portable medium, even on a home media server 110 which is not equipped with a recordable DVD drive.

In another embodiment of the system, home appliances (e.g., the refrigerator, the toaster, the air conditioner) and other home systems (e.g., security, air conditioning) are all provided with RF transmission devices to communicate with the home media server 110. Each device may also be configured with it's own internal network address and/or Internet address. Users may then access information pertaining to these devices and/or control these devices from any room in the home or over the Internet. In one particular embodiment, the user's automobile is outfitted with an RF transmitter and a network address. Thus, in this embodiment, the automobile is capable of reporting maintenance information to the user via the home media server 110 (e.g., low brake pads, oil change needed . . . , etc).

In one embodiment, a user may publish a home Web page containing up-to-date information on each home appliance or other network device. Accordingly, users of this embodiment are able to monitor and control home appliances and systems from anywhere in the world. In one embodiment this includes the ability to select broadcast listings and direct the home media server 110 to make recordings (e.g., based on date/time or broadcast ID code). In addition, in one embodiment, users may connect remotely to the home media server to review email and/or voicemail listings (which may be displayed to the user in the form of a single, generic "message" box). Voicemail messages may be streamed to the remote user's location over the Internet or other network.

Telephony Embodiments

Figure 7A:
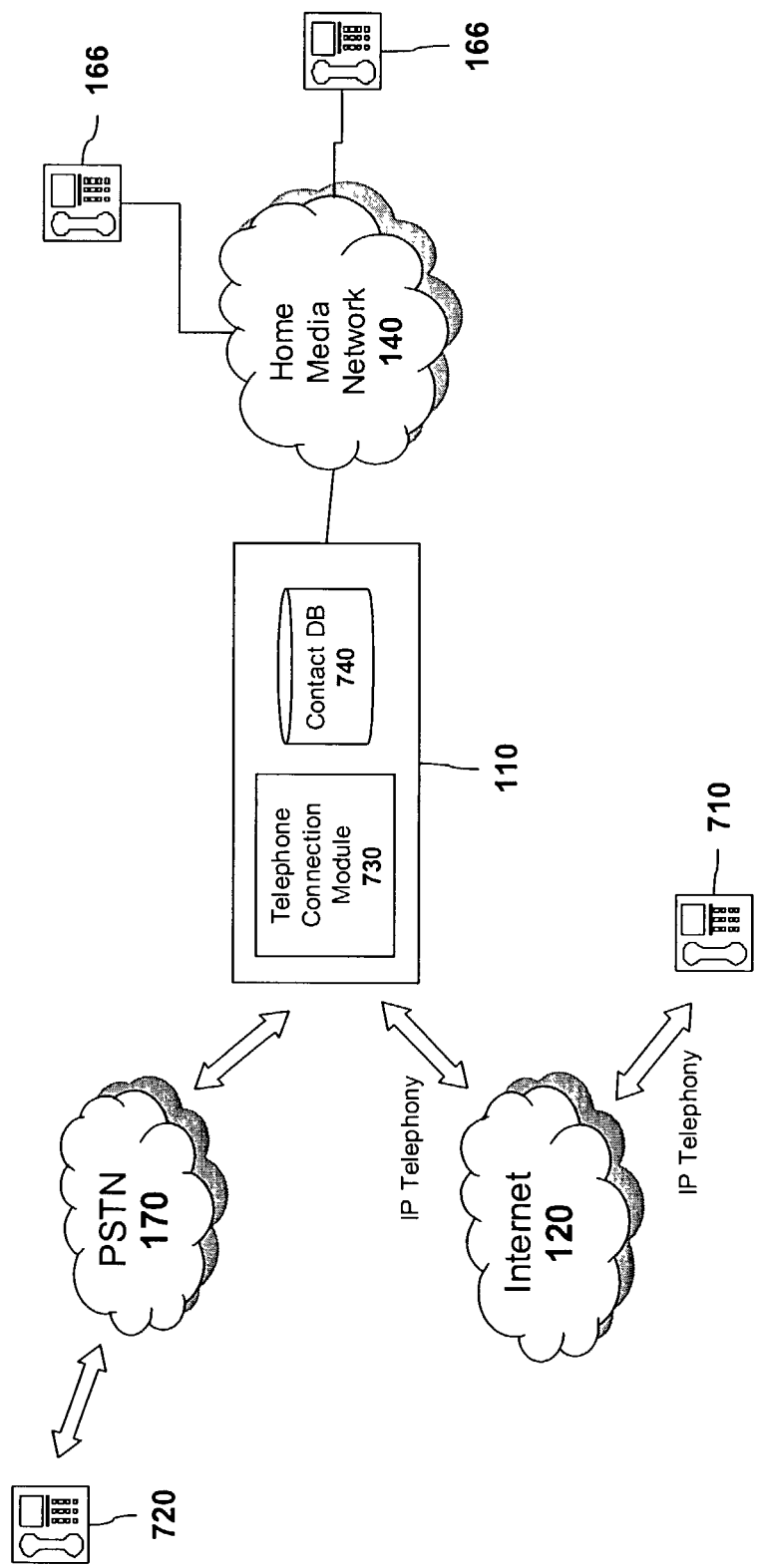
FIG. 7a illustrates one embodiment of a home media server for coordinating between standard telephone services and IP telephone services.

As illustrated in FIG. 7a, in one embodiment, home telephone devices 166 may also be configured to run through the home media server 110. In this embodiment, incoming faxes and voicemail are stored on the home media storage device 230 and may be accessed from any room in the house (e.g. from telephone devices 166, personal computers 160, PDAs 165, and/or video systems 192/171). In addition, phone number and address information may be stored in a contact database 740 on the home media server 110 and accessed through the various telephone devices 166 (or other home media devices). Offloading user contact data from the telephone devices 166 in this manner allows telephone devices 166 to be manufactured will less memory and less processing power, further decreasing costs to the end user.

As illustrated in FIG. 7a, in one embodiment, the home media server 110 includes a telephone connection module 730 which coordinates between standard telephony calls placed/received over the public switched telephone network ("PSTN") 106 and calls placed over the Internet 102 using IP telephony protocols. The telephone connection module 730 will automatically route incoming calls from both sources to the same set of home telephone devices 166 (or other home media devices such as the user's personal computer 160).

Users may specify whether a particular outgoing call should be placed over the Internet 102 (e.g., to an IP telephony device 710) or over the PSTN 170 (e.g., to a standard telephone device 720). In one embodiment, the telephone connection module 730 analyzes each outgoing telephone connection request to determine whether the call should be routed through the Internet 102 or through the PSTN 170. The telephone connection module 370 may factor in various types of connection data to make telephone connection determinations. For example, a user may specify certain contacts within the contact database 740 for which IP telephone connections should be used and certain contacts for which standard telephone connections should be used. In one embodiment, the telephone connection module 730 will select a particular connection based on whether it is the least expensive option for the user (e.g., for contacts with both IP and standard telephone capabilities). Another variable which may be factored into the selection process is the connection throughput available to the user over the Internet. More specifically, the telephone connection module 730 may initially test the connection throughput (including the availability of a reliable connection) over the Internet 102 and place an IP telephony call only if some minimum level of throughout/reliability is available. Any of the foregoing variables, alone or in combination, may be evaluated by the telephony connection module 730 to select and appropriate telephone connection.

One embodiment of a protocol architecture for supporting IP telephony and related communication functions on the home media server 110 is illustrated in FIG. 2b. Various telecommunication standards are supported by this embodiment, including the H.248 media gateway control standard ("MEGACO") standard; the ITU-T H.323 and session initiation protocol ("SIP") standards for multimedia videoconferencing on packet-switched networks; the Realtime Control Protocol ("RTCP") standard—a companion protocol to the realtime transport protocol ("RTP") (described above) used to maintain a minimum QoS; and the ITU T.120standard for realtime data conferencing (sharing data among multiple users).

In addition, various audio and video codecs are supported by the illustrated embodiment, including G.711, G.723, and G.729 (for audio); and H.261 and H.261 (for video). As illustrated, each of these codecs may be executed above RTP, an IP protocol that supports realtime transmission of voice and video. Each of the foregoing IP communication protocols may be utilized by media server 110 application programs through the programming interfaces of the media toolkit 260.

Figure 7B:
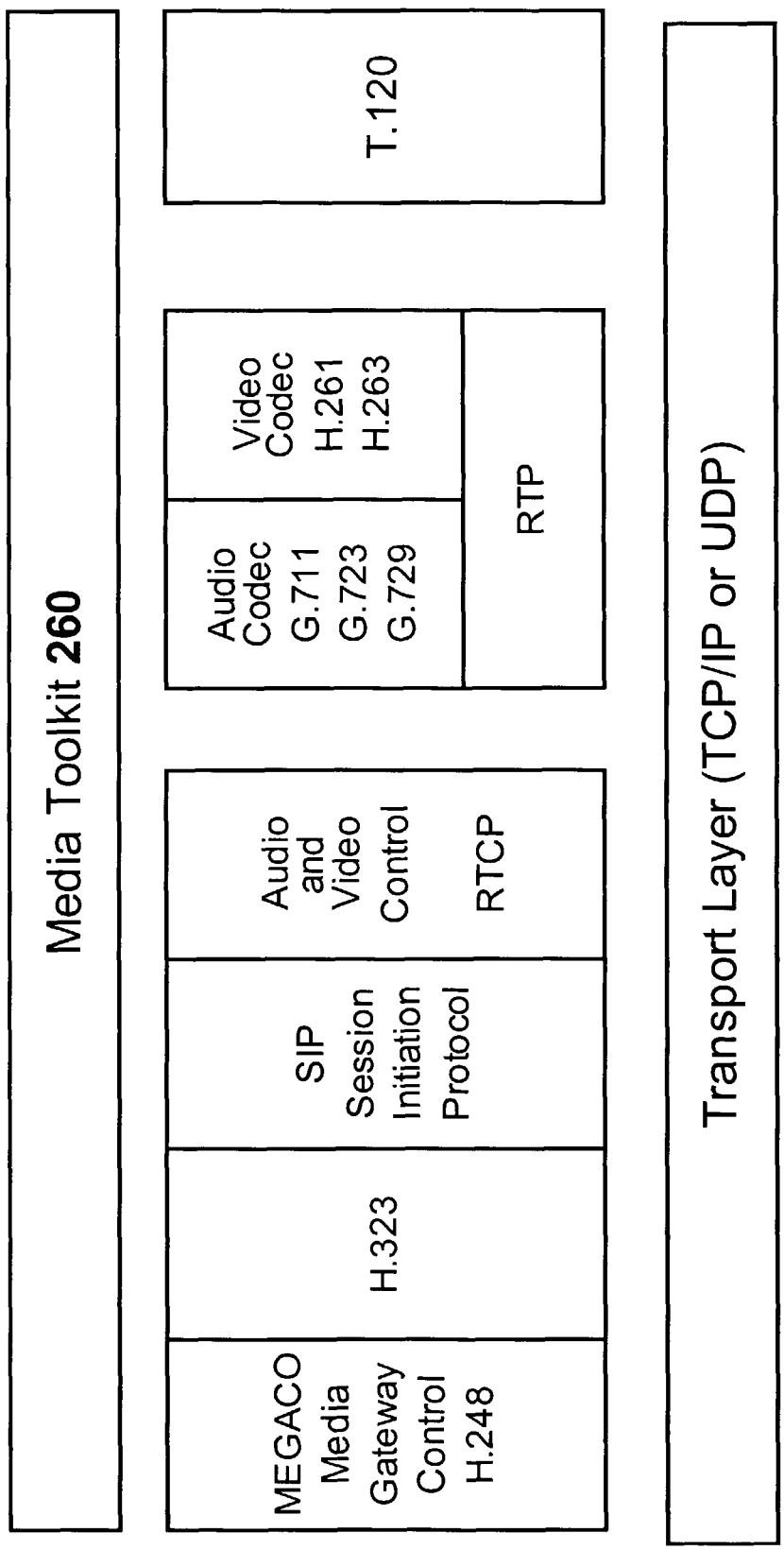
FIG. 7b illustrates one embodiment of a software architecture for implementing standard telephone, IP telephone and/or video conferencing.

It should be noted that, although the embodiment illustrated in FIG. 7b includes a specific set of communication protocols, various other communication protocols may be implemented within the home media server 110 while still complying with the underlying principles of the invention. For example, in one embodiment, new protocol stacks (both proprietary and industry-standard) may be automatically transmitted from the NOC 180 and installed on the home media server 110 as they become available.

FIG. 7c illustrates a signal diagram representing the set up and termination of a telephony connection according to one embodiment of the home media server 110. At 750, the home media server transmits a call connection "invitation" on behalf of User 1 to User 2. Once User 2 accepts the call, a "success" message is transmitted back to the home media server 110 at 751. In response, the home media server 110 acknowledges receipt of the "success" message at 752 and allocates a media stream 760 to support bi-direction audio communication between User 1 and User 2. To tear down the media stream 760, one of the users must hang up the phone, resulting in a "bye" message 753, 754 followed by a termination acknowledgement ("success") from both sides 755, 756.

Broadcast and Packet-Switched Channel Coordination

Figure 8A:
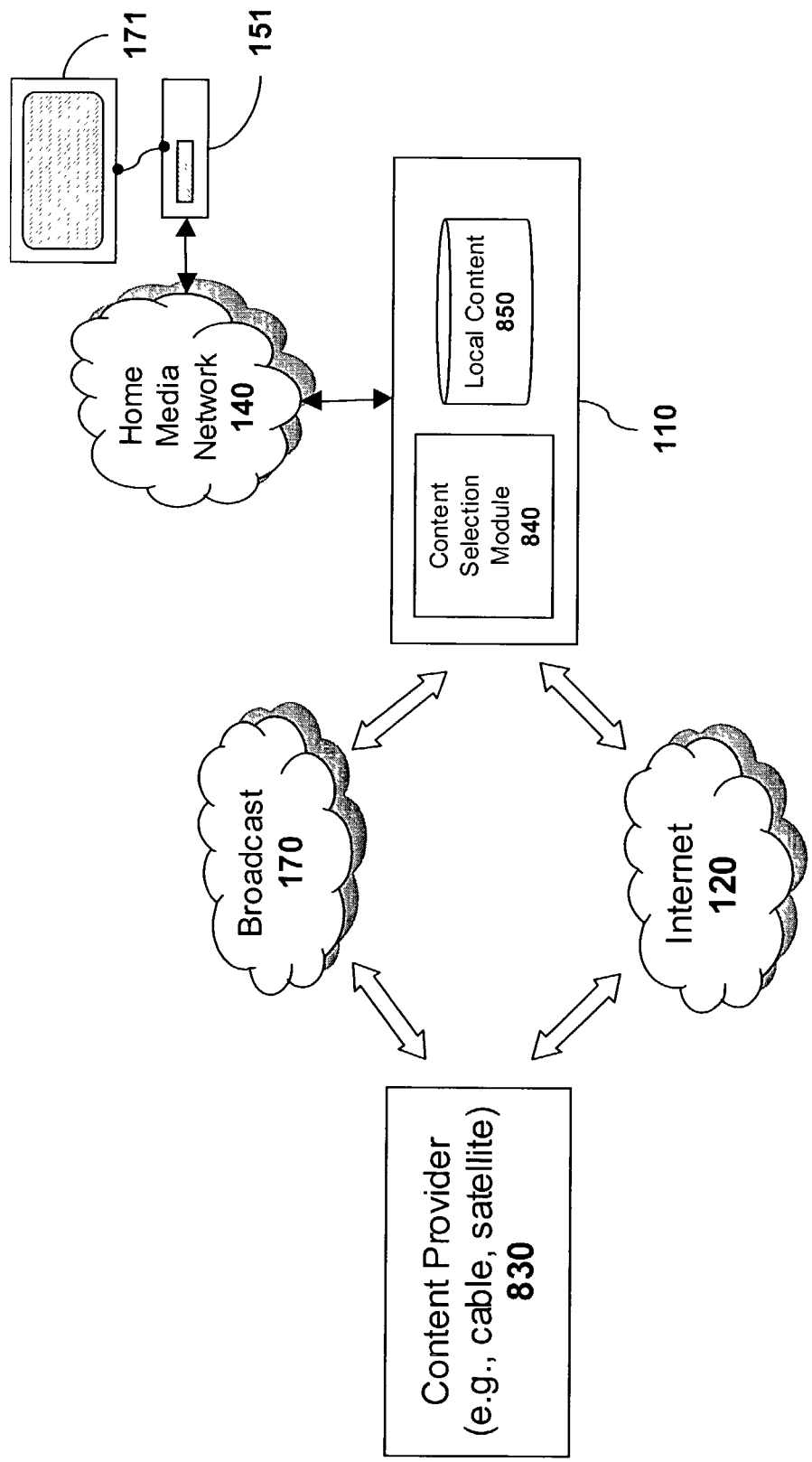
FIG. 8a illustrates a home media server coordinating between standard broadcast channels and packet-switched channels (e.g., the Internet).

In one embodiment illustrated in FIG. 8b, content providers 830 may transmit content to home media server 110 over Internet channels 102 as well as standard broadcast channels 170. The transmitted content may then be cached locally in a content database 850. When a user subsequently requests the same content to be played back on an audio device or video device 171 (e.g., via media node 192), it will be replayed to the user directly from the local content database rather than over a broadcast channel. In one embodiment, a content selection module 840 will determine whether to retrieve the content through a broadcast channel or directly from the content database 850.

In one embodiment, the home media server 110 and/or the content provider 830 will monitor the preferences of each user in the media server 110 household to determine the content which will be requested during certain times of the day, and/or days of the week. For example, if a user watches "the Simpsons®" at 6:00 PM, the home media server 110 and/or content provider 830 will record this behavior. The content provider 830 may then transmit the latest Simpsons episode to the home media server 110 over the Internet 102 before its scheduled broadcast at 6:00 PM (e.g., during periods of the day or evening when traffic on the Internet 102 is low). Various other pre-recorded broadcast programs may be transmitted to the home media server 110 over the Internet rather than over a dedicated broadcast channel, thereby freeing up a substantial amount of inefficiently used broadcast network bandwidth (pre-recorded content currently represents the vast majority of all broadcast content).

As indicated in FIG. 8b, this embodiment of the home media server 100 will provide a seamless mechanism for transitioning from standard digital broadcast channels (e.g., MPEG-2 channels) and analog broadcast channels to packet switched isochronous channels (for live broadcasts) and asynchronous channels (for pre-recorded broadcasts). Initially, the breakdown between broadcast and packet switched channels (e.g., TCP/IP) will be similar to that illustrated in column 804, with analog broadcast 803 taking up approximately half of the available bandwidth, with the other half split between digital broadcast 802 and packet switched channels 800. As content providers begin to switch over to a packet-switched transmission scheme, this breakdown will change as indicated at bandwidth allocation 805, with packet-switched channels taking up approximately half of the available bandwidth and the remainder split between analog broadcast 812 and digital broadcast 811.

Finally, when standard analog and digital broadcast channels have been phased out completely, all content will be delivered over packet switched channels as indicated in bandwidth allocation 806. Many packet switched protocols support both asynchronous and isochronous data transmissions. Accordingly, several isochronous channels may be provided to support live, real time events (e.g., sports events, the evening news, . . . etc) and the remainder of the bandwidth may be allocated to pre-recorded events (e.g., sitcoms, game shown, talk shows, . . . etc). These pre-recorded events/shown may be asynchronously downloaded to the home media server 110 at any time of the day or evening (e.g., during periods of low network activity), resulting in a much more efficient allocation of available transmission bandwidth.

Because embodiments of the home media server 110 described above are capable of receiving, storing and coordinating content transmitted from both packet switched channels (e.g., TCP/IP) and standard broadcast channels, the transition illustrated in FIG. 8b may be accomplished seamlessly, while at the same time improving the overall quality of service to the end user.

Figure 8C:
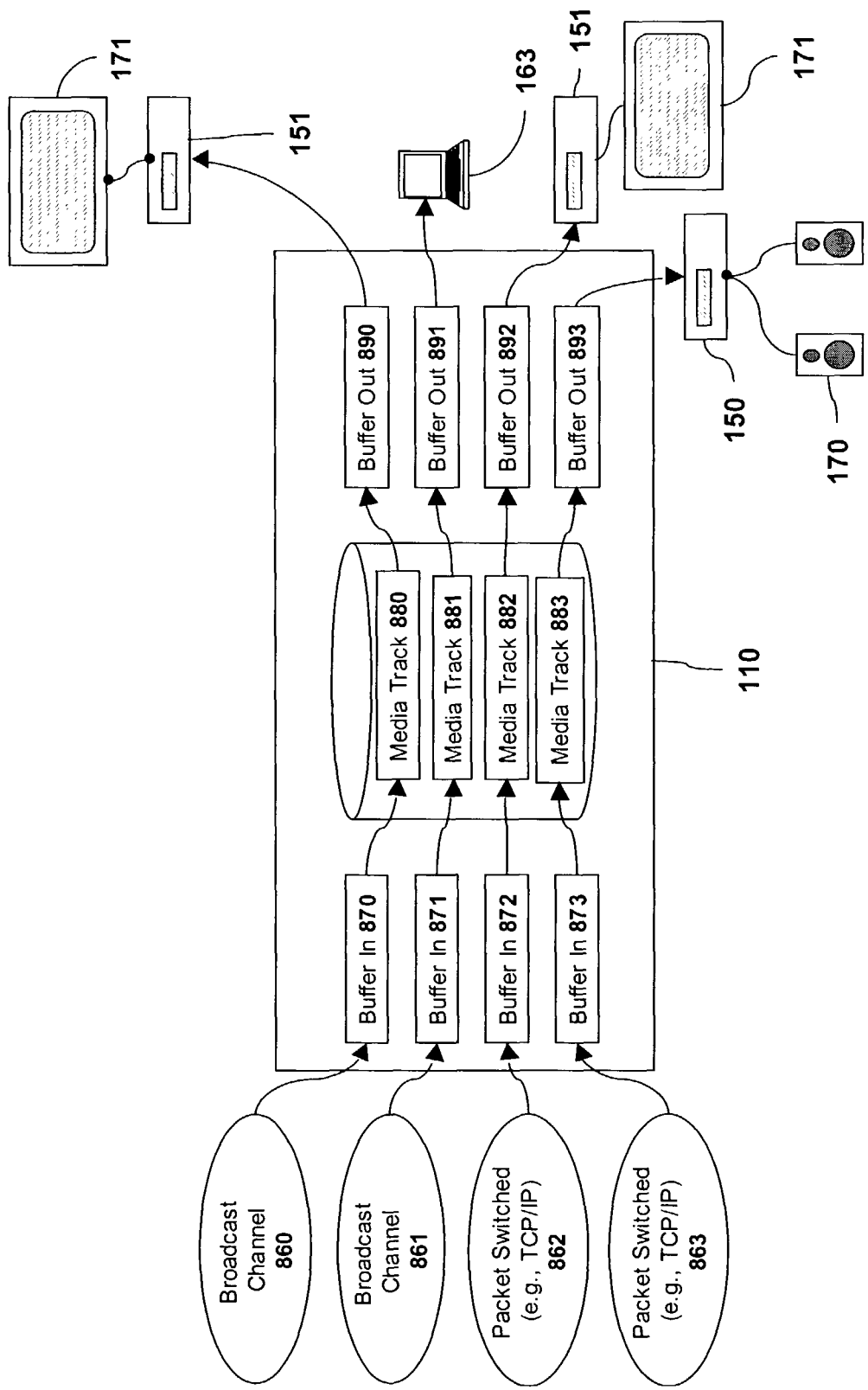
FIG. 8c illustrates multimedia buffering according to one embodiment of the invention.

In one embodiment, several concurrent, real-time multimedia streams are supported by the home media server 110 through buffering and/or disk storage techniques as illustrated in FIG. 8c. More specifically, incoming multimedia content 860-862 from several different channels (e.g., standard broadcast channels 860, 861 and packet switched channels 862, 863) may be buffered in a set of input buffers 870-873 and output buffers 890-893 on the home media server 110. The input buffers and output buffers 870-873 and 890-893, respectively, may be portions of memory allocated within the main memory 201 (see FIG. 2). Alternatively, or in addition, the input/output buffers may be configured on the communication modules 240-245, within the system ASIC 210, and/or as separate modules on the home media server 110 motherboard.

In one embodiment, the mass storage device 230 reads the multimedia data from each of the input buffers 870-873 and writes the data to a set of multimedia tracks 880-883. The multimedia data is subsequently read from each of the multimedia tracks 880-883 to a set of output buffers 890-893, from which it is transmitted to one or more of the destination multimedia devices 191, 192. Buffering data streams on the home media server 110 in this manner provides significant cost efficiencies for the entire system. Specifically, because the multimedia data is buffered at a single distribution point within the home media network 190 (i.e., the home media server 110), no buffering is required at each of the individual multimedia devices 191-199, thereby significantly reducing the cost and complexity of these devices.

The mass storage device 230 of this embodiment has enough bandwidth in its read/write operations to support several multimedia streams at once. Although the seek time of the mass storage device 230 (i.e., the time required to jump from one track to another) may be relatively low (i.e., relative to its read/write bandwidth), buffering of the multimedia data in input and output buffers as described ensures that the various streams will be provided to their respective multimedia devices 191-199 without interruption.

In one embodiment, each of the multimedia streams 860-863 operate independently of one another. For example, if playback of a particular multimedia stream is paused, e.g., from multimedia device 191, the home media server 110 will interrupt transmission of multimedia content from the output buffer 893 associated with that device 191, and will begin storing subsequent, incoming multimedia content on the mass storage device 230 (e.g., within the media track 883). However, this will not affect playback at any of the other multimedia devices on the network 190. When playback is resumed, the content will be streamed from the output buffer 893 (and media track 883) from the same point at which is was paused (thereby providing real time, time-shifting functionality for live, real-time broadcasts).

In one embodiment, an indexing module (not shown) will generate a content index for users of the home media server 110 which will provide users with a comprehensive, seamless listing of multimedia content from the Internet (e.g., streaming media content), broadcast channels (including live and pre-recorded broadcast channels), asynchronous/isochronous multimedia channels, and/or various other media sources/channels. Accordingly, this embodiment will provide users with the ability to navigate through and select content from a virtually unlimited number of different multimedia sources and channels having any knowledge of the underlying protocols and communication infrastructure supporting the sources/channels.

Intelligent Buffering and Bandwidth Allocation

Virtually all communication channels are bandwidth-limited in some manner, due to the physical limitations of the underlying transmission medium and/or the signaling limitations of the channel (e.g., the channel's allocated frequency spectrum). For example, a 100 Base-T Ethernet network is capable of providing a total data throughput of 100 Mbps, which is shared by all nodes (e.g., computers) on the network. Similarly, multimedia devices 191-199 communicating on the home media network 190 described above all share some maximum network signaling rate (e.g., if a standard IEEE 802.11 b network is employed the signaling rate is 11 Mbps).

Because bandwidth is shared on these systems, overall network performance may degrade as a result of nodes performing concurrent, high-bandwidth network transactions. This can be particularly problematic on networks such as the home media network 190 which support real-time multimedia services. More specifically, high quality audio and video signals transmitted from the home media server 110 to multimedia nodes 191, 192, require some minimum level of network bandwidth to be rendered properly (i.e., without distortion or interruption). Accordingly, one embodiment of the invention includes intelligent buffering and bandwidth allocation techniques to ensure smooth playback of the multimedia signal at each of the multimedia nodes 191, 192.

Figure 9A:
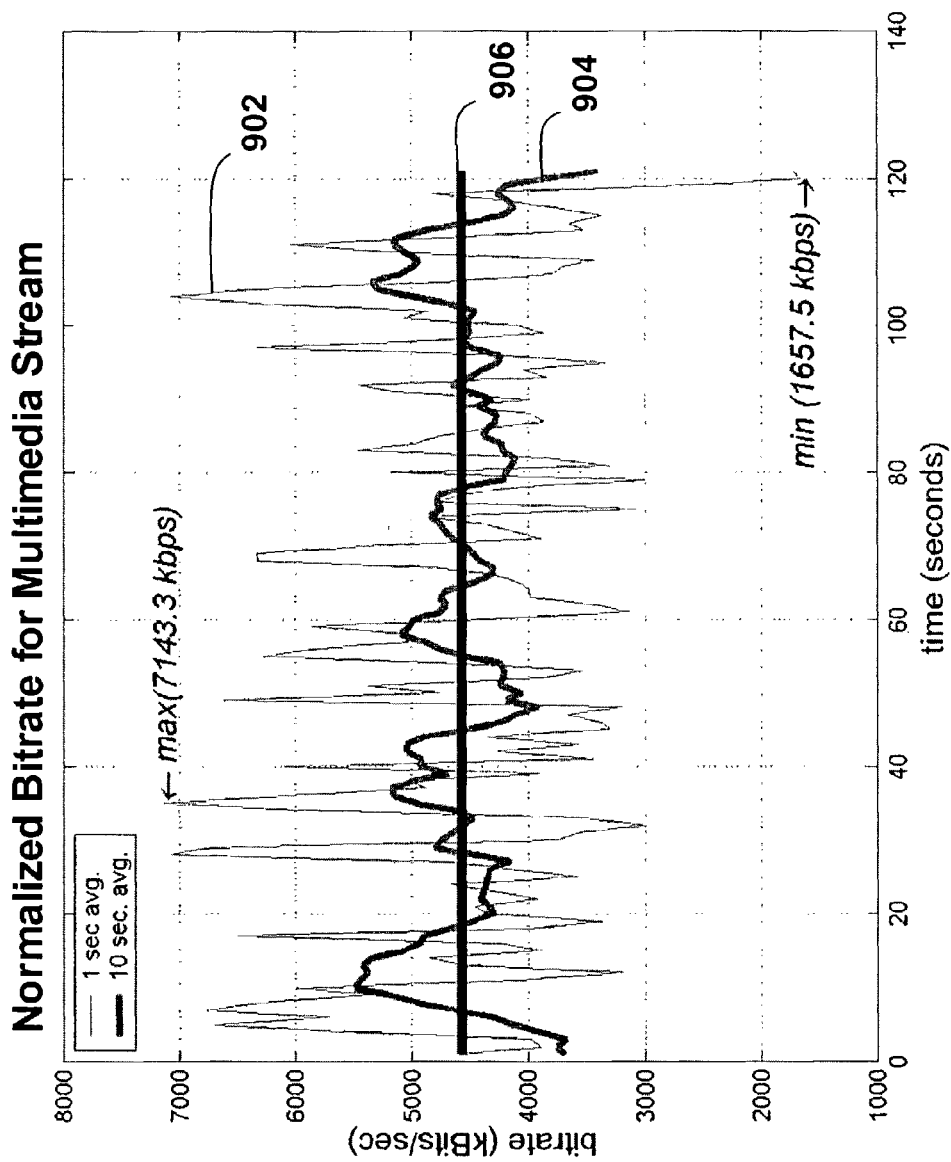
FIG. 9a illustrates a histogram showing a normalized bitrate for a particular multimedia stream.

FIG. 9a illustrates a histogram of normalized bitrate data for a particular multimedia stream (e.g., a DVD) over a period of 120 seconds. Curve 902 shows the bitrate averaged at one second intervals whereas curve 904 shows the bitrate averaged at 10 second intervals. The average bitrate over the entire 120 second interval is represented by curve 906 (approximately 4.7 Mbps). Accordingly, based on the histogram data, the effective bitrate required to properly render the video stream at multimedia node 191 fluctuates significantly—from a maximum throughput of 7.143 Mbps to a minimum throughput of 1.657 Mbps.

Figure 9B:
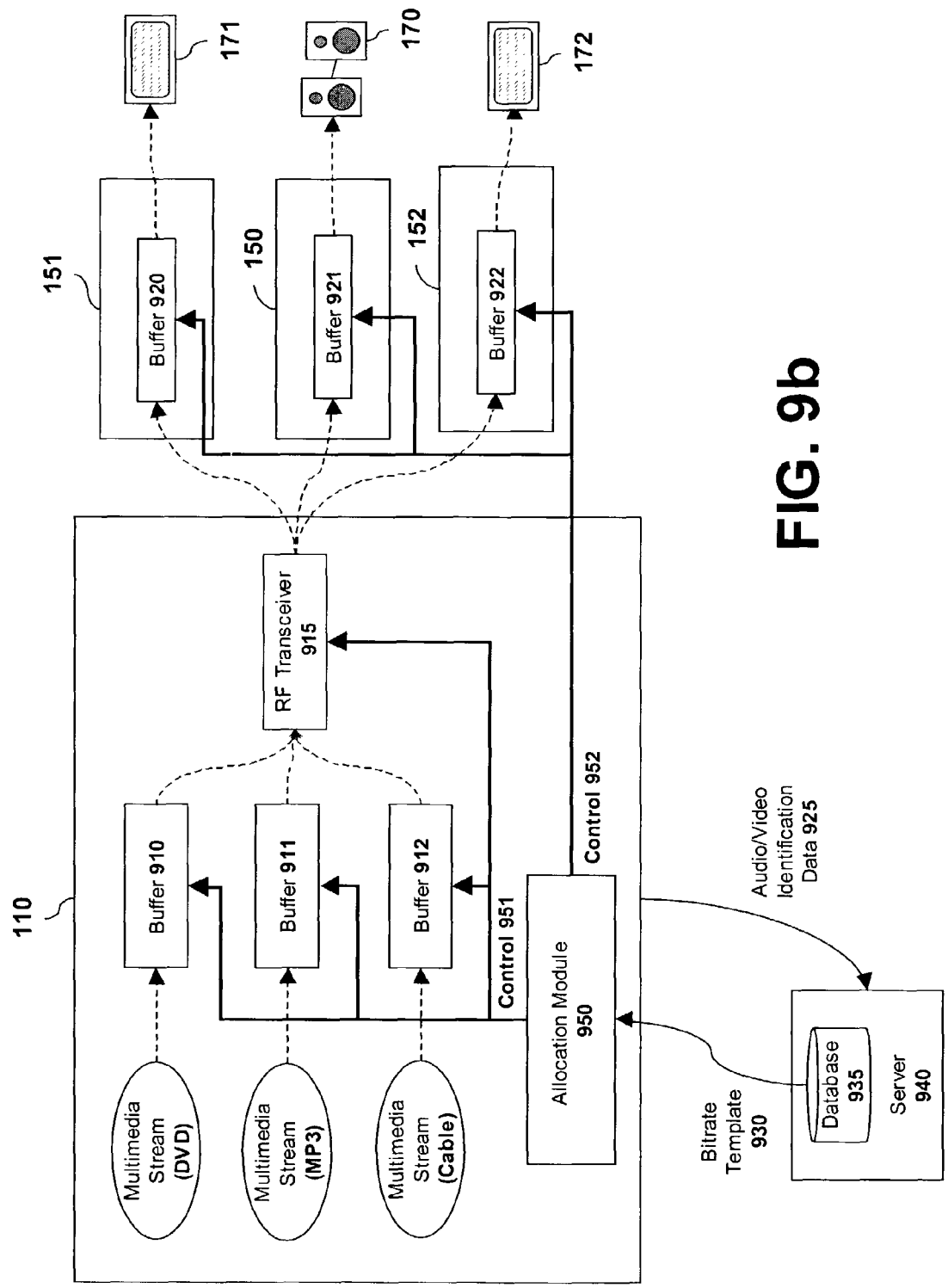
FIG. 9b illustrates one embodiment of a system for intelligent bandwidth allocation and buffering.

One embodiment of the home media server 110, illustrated in FIG. 9b, uses this type of bitrate data to allocate bandwidth and buffering levels for multimedia playback. Accordingly, when a user selects audio or video content (e.g., a DVD) to be transmitted to a multimedia node (e.g., video node 192), the home media server 110 initially retrieves a bitrate template 930 (e.g., a histogram of bitrate data) associated with the requested content from a bitrate database 935. The database 935 may be maintained locally on the home media server 110 and/or, as illustrated, may be maintained on a remote database server 940 (e.g., maintained at the NOC 180). In either case, the database 935 may be continually updated as new multimedia content becomes available. Once the bitrate template 930 is initially downloaded from the remote server 940, a copy may be stored locally on the home media server 110 for future reference. In one particular embodiment, the bitrate template 930 may be transmitted along with the underlying multimedia signal (e.g., embedded within the MPEG-2 stream read from a DVD or broadcast over a cable channel), rather than maintained in a separate database 935.

If the bitrate template 930 is maintained in a database 935, various types of identification data 925 may be used to identify the correct template for the multimedia content being played including, but not limited to, those set forth in co-pending application entitled SYSTEM AND METHOD FOR SCALING A VIDEO SIGNAL, Ser. No. 09/632,458 (incorporated by reference above). For example, a checksum may be calculated for a known unique portion of the multimedia content and compared with checksums stored in the database 935. Similarly, if the content is stored on a CD or DVD, the CD/DVD serial number (or other embedded identification code) may be used to perform a database 935 query. Various other identification techniques may be used to identify the multimedia content while still complying with the underlying principles of the invention. Once the correct bitrate template 930 is identified, it is transmitted from the remote server 940 to the home media server 110. Alternatively, if the data is stored locally on the home media server 110, it is retrieved directly from the home media server's storage device 230.

In one embodiment, an allocation module 950 running on the home media server 110 analyzes the bitrate template 930 to establish an efficient bandwidth allocation and/or buffering policy for transmitting the multimedia stream(s). The allocation module 950 acts as a data "throttle," increasing or decreasing the data throughput from the home media server 110 to the multimedia nodes 191-192 as necessary to meet the bitrate requirements of each multimedia stream (e.g., through control of the home media server output buffers 910-912 and/or RF transceiver 915). The goals of one embodiment of the system are (1) to ensure that the underlying multimedia content is reproduced at the multimedia node 192 without interruption/jitter; (2) to minimize the memory requirements at the multimedia node 192; (3) to minimize the playback delay experienced by the end user; and/or (4) to minimize the bandwidth required to accurately reproduce the multimedia content at the node 192. Any of these goals, alone or in combination, may be factored into the allocation module's 191's bandwidth/buffering allocation policy.

In one embodiment, the allocation module 950 analyzes the bitrate template 930 to ensure that the amount of multimedia content in each multimedia node buffer—e.g., buffer 920 of multimedia node 192—is sufficient to handle upcoming spikes. For example, given the bitrate template data set forth in FIG. 9c, the multimedia node buffer 920 must have sufficient multimedia data (i.e., an adequate number of bits) to handle the bitrate spike between 3 seconds and 4 seconds (i.e., 6.2 Mbps). As such, by analyzing the bitrate template 930 as a whole, the allocation module 950 may increase the allocated data throughput between 1 second and 3 seconds to sufficiently fill the buffer 920 by the time the bitrate spike arrives (i.e., at 3 seconds). Thus, the number of bits consumed during the spike (6.2 Meg) must be less than or equal to the number of bits in the buffer at start of spike period (3 seconds) minus the bits added to buffer during spike period (i.e., the per-second bitrate). Otherwise, playback of the multimedia stream will stall due to an underrun condition (i.e., a lack of multimedia data at the multimedia node 192).

Figure 9D:
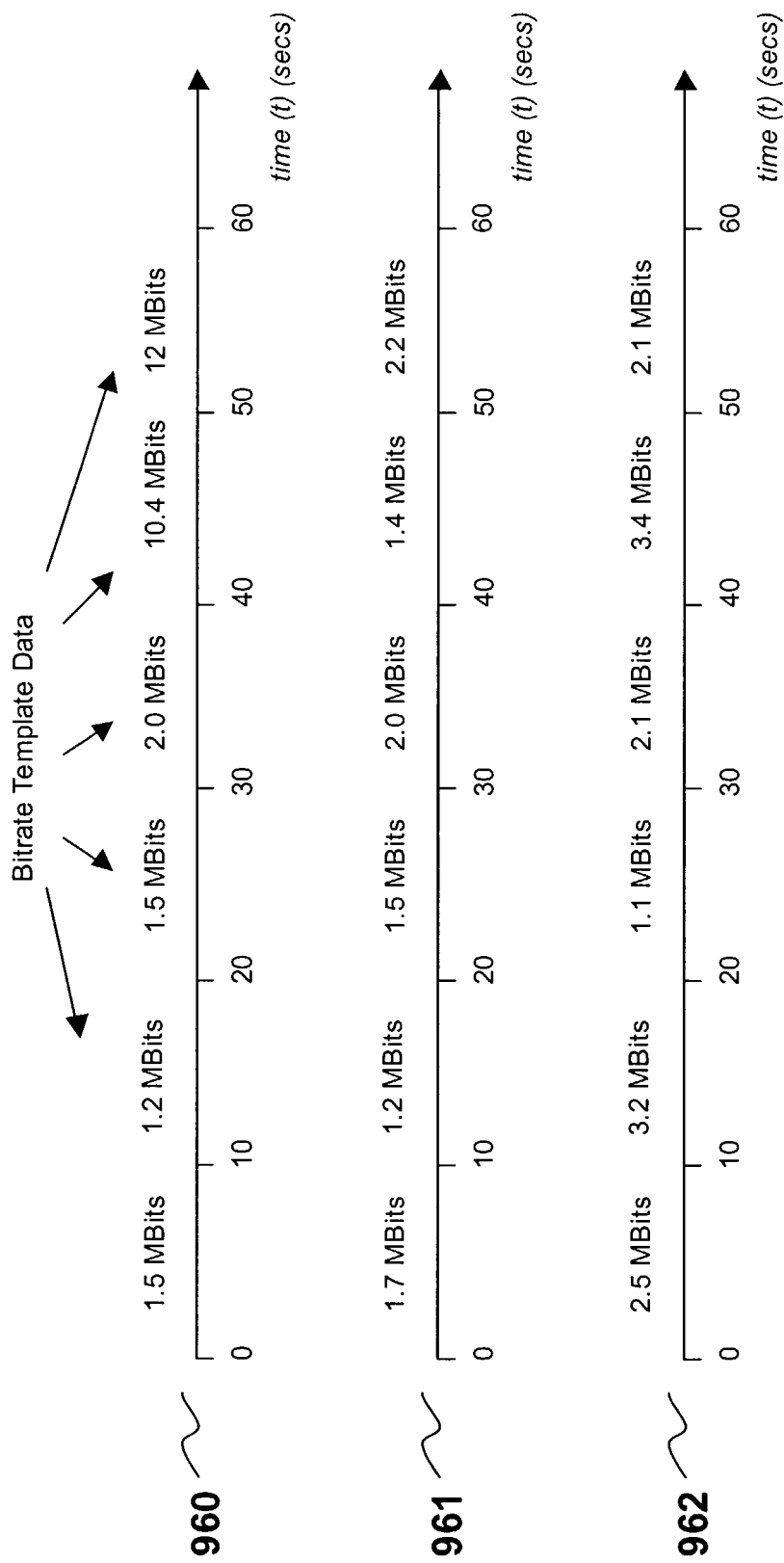
FIG. 9d illustrates bitrate data for three separate multimedia streams normalized at 10 second intervals.

The allocation module 950 may also factor in bitrate templates 930 of other multimedia streams when making allocation decisions for a given stream. For example, when making allocation decisions for the DVD stream in FIG. 9b (which passes through buffers 910 and 920), the allocation module 950 may evaluate the bitrate requirements of the other two streams (i.e., the MP3 stream and Cable stream passing through buffers 911, 921 and 912, 922, respectively). As such, if one particular stream requires a significant amount of throughput at a given point in time, the allocation module will take anticipatory steps to ensure that sufficient multimedia data will be available. For example, in FIG. 9d, the bitrate data illustrated in timeline 960 indicates a severe bitrate spike between 40 and 60 seconds. The spike is severe enough that in order to properly render the multimedia stream associated with it, the allocation module 960 may need to fill the multimedia node buffer by the time the spike arrives (i.e., at 40 seconds) and also divert a significant amount of the system bandwidth to the stream to avoid an underrun condition. As such, in anticipation of the spike, the allocation module 950 may attempt to fill all the buffers on the system including the buffers of the other two streams (associated with the bitrate data shown in timelines 961 and 962) so that by the time the spike arrives, it can divert bandwidth from these streams to the stream with the bitrate spike. It should be noted that the foregoing bandwidth/buffer allocation example was for the purpose of illustration only and should not be read to limit the scope of the invention.

In one embodiment, the when a new playback stream is requested at a multimedia node 192, the allocation module 950 will initially allocate all system bandwidth available at that time to the stream. It will subsequently decrease the bandwidth (i.e., the "throttle") only when other multimedia nodes require additional bandwidth and/or when the buffer at the multimedia node 192 fills up. Accordingly, one goal of this embodiment is to keep the buffer at the multimedia node 192 filled to its limit at all times (e.g., so that it will be ready for upcoming spikes).

Figure 9E:
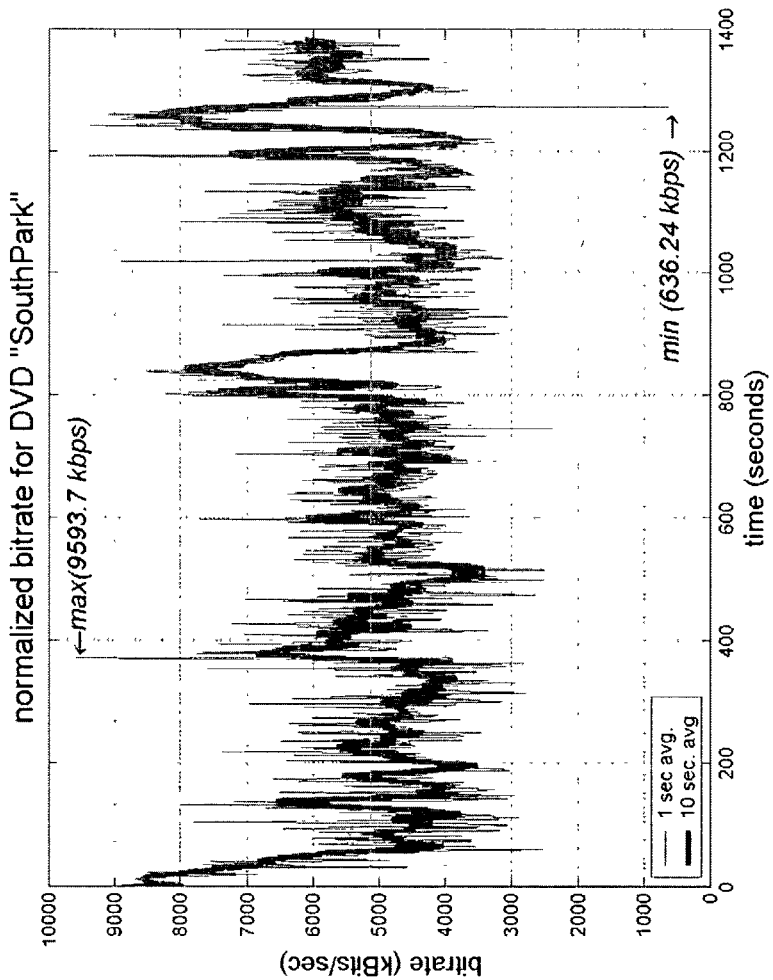
FIGS. 9e-f illustrate histograms of normalized bitrate data for various DVDs.

Playback of the multimedia data from the multimedia node buffer 920 may start at different times, depending on the histogram data associated with the content. For example, the bitrate for certain high definition television broadcasts or DVDs such as the one illustrated in FIG. 9e (which shows bitrate data for the movie "South Park") may start off at a relatively high value (i.e., approximately 8.6 Mbps). As such, it may be necessary to accumulate a certain amount of multimedia data in the multimedia node buffer 920 before initiating playback. The table 970 illustrated in FIG. 9e shows the amount of data that must be buffered before playback (column 972), given a particular multimedia stream bitrate (column 971). The table 970 also indicates the amount of time which a user must wait before playback begins (column 973). As indicated in the bottom row of the table 970, at a bitrate of 9 Mbps, no buffering of the multimedia signal is required. In one embodiment, playback is initiated by the allocation module 950 (as indicated by the control signal 952 in FIG. 9b).

Figure 9F:
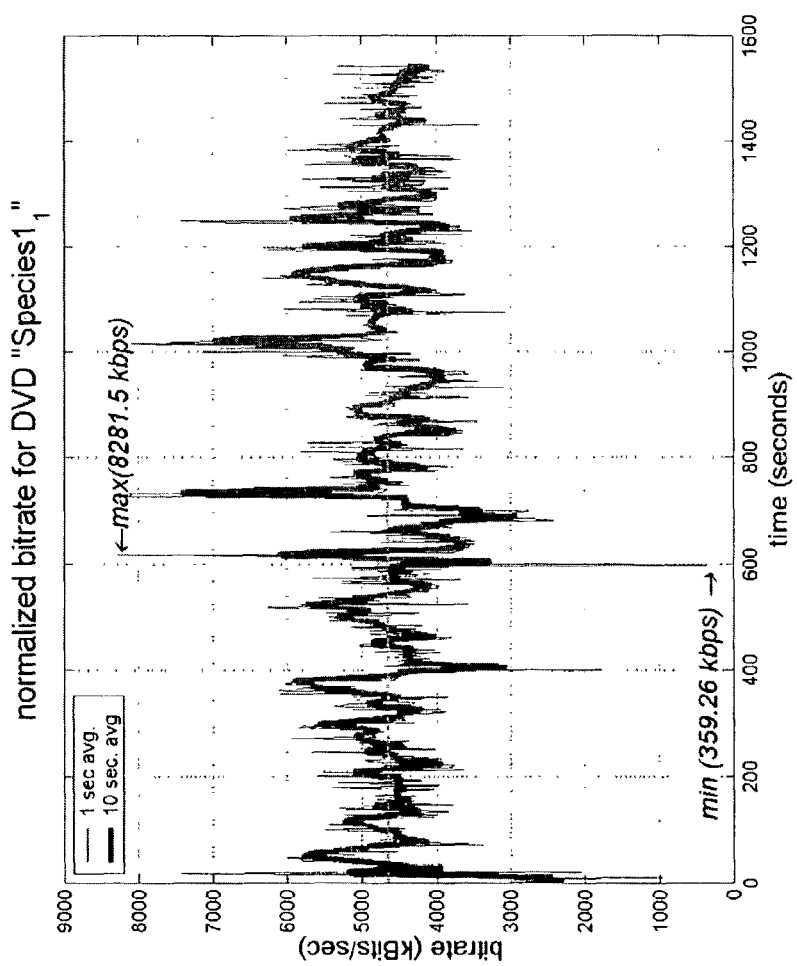

In contrast to multimedia stream described by the histogram of FIG. 9e, the multimedia stream described by the histogram illustrated in FIG. 9f (the DVD for the movie "Species 1") requires significantly less buffering before playback. More particularly, as indicated in table 975, no pre-playback buffering is required at a bitrate of 5 Mbps. As such, if 5 Mbps or more system bandwidth is available, playback may begin as soon as the stream reaches the multimedia node 192. In addition, in one embodiment, the allocation module 950 may initially allocate more bandwidth than required to fill the multimedia node buffer 920 during playback (e.g., so that more system bandwidth may be allocated elsewhere once the buffer is full).

In one embodiment, when a new playback stream is requested from a multimedia node 192, the allocation module 950 may initially allocate just enough system bandwidth to meet some minimum playback delay threshold. Thus, if this minimum delay threshold is set at 4.5 seconds, the allocation module 650 must allocate at least 7 Mbps to reproduce the multimedia content represented by the histogram of FIG. 9e (see Table 970, $5^{th}$ row). By contrast, to meet the minimum delay threshold for the multimedia content represented by the histogram of FIG. 9f, the allocation module 950 may allocate a bitrate of less than 5 Mbps (see Table 975). After the initial bandwidth allocation, the allocation module may use the histogram data to ensure that the amount of multimedia content in the multimedia node buffer 920 is sufficient to handle upcoming spikes in bitrate (as described above).

Conditional Access and Encryption

Figure 10:
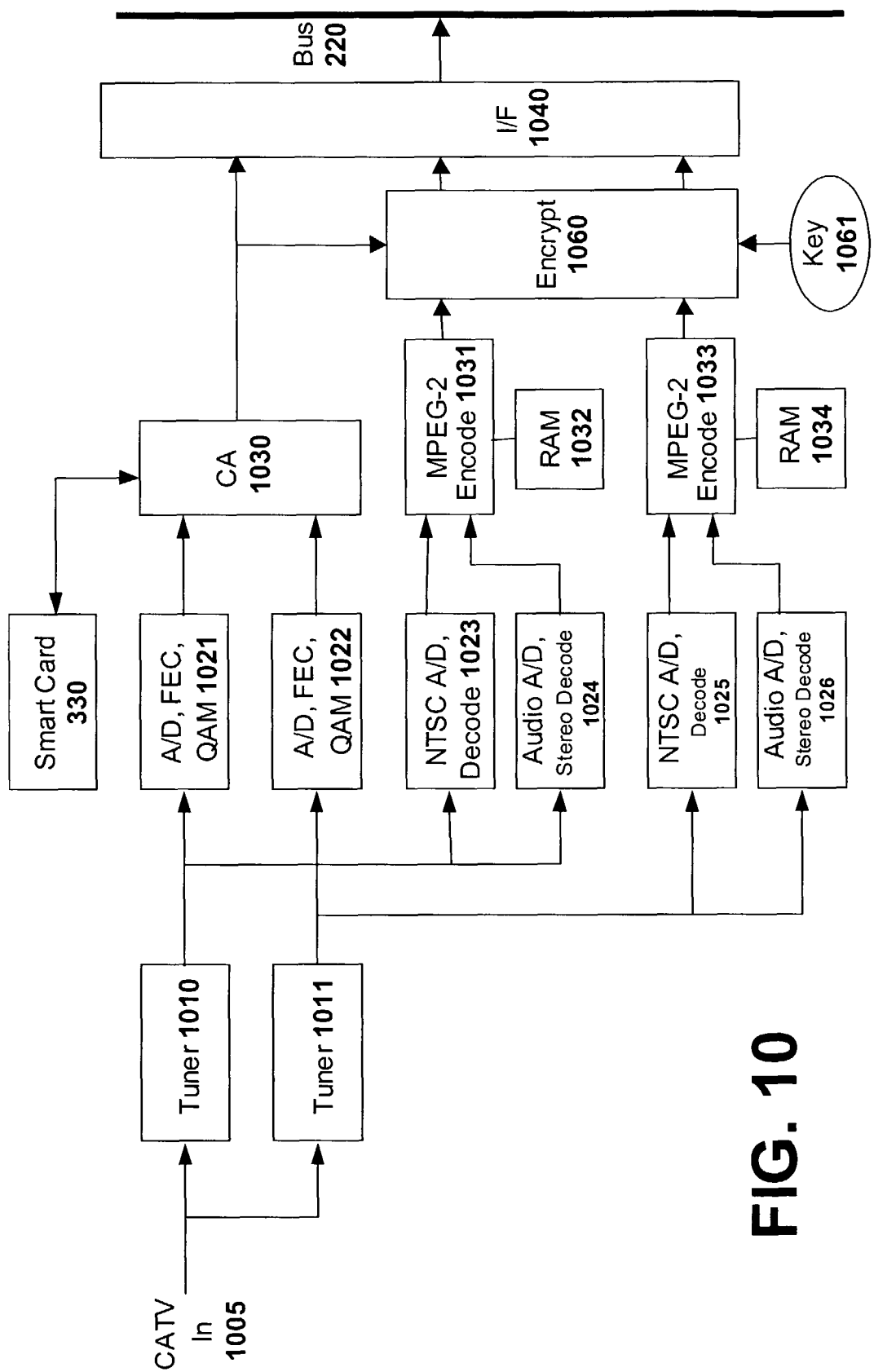
FIG. 10 illustrates a cable television module according to one embodiment of the invention.

One embodiment of a cable broadcast module for receiving one or more broadcast channels is illustrated in FIG. 10. This embodiment includes two tuners 1010, 1011 for concurrently tuning to two separate broadcast channels (e.g., to be viewed at two separate multimedia nodes on the home media network 190). Additional tuners may be included within the cable broadcast module as necessary (i.e., for receiving additional broadcast channels).

In one embodiment of the system, a smartcard 330 (see also FIG. 3) inserted into one or more of the media modules 320-325 may be programmed with a specific set of access rights defining the particular channels to which users are permitted access. The smartcard 330 may work in conjunction with a conditional access module 1030, which will prevent certain channels/content from being transmitted on the system which the user does not have the right to receive. In one embodiment, different members of a family may be assigned smartcards 330 with different access privileges. For example, children may be assigned smartcards 330 which limit the channels and/or Internet sites which they are permitted to access.

In the illustrated embodiment, the signal outputs from each of the tuners 1010, 1011 are fed into separate audio and video analog-to-digital decoder modules 1024, 1026 (audio) and 1023, 1025 (video), respectively. In one embodiment, the signals are then re-encoded with a compression codec. For example, in the embodiment shown in FIG. 10, MPEG-2 encoder modules 1031, 1033 encode the audio/video signals into MPEG-2 format (i.e., which may subsequently be decoded by any multimedia devices 191, 192 on the home media network 190). It should be noted that various other digital compression codecs may be used (e.g., AC-3, MPEG-1, . . . etc) while still complying with the underlying principles of the invention.

In addition, in one embodiment, before being transmitted onto the system bus 220, the encoded multimedia signals are encrypted by an encryption module 1060 using a unique encryption key 1061. As such, in this embodiment, all multimedia data stored on the home media server 110 (i.e., on the mass storage device 230) and transmitted across the home media network 190 are encrypted, thereby preventing copying and playback by any unauthorized devices listening in one the network 190 or on the system bus 220. Moreover, authorized multimedia devices 191-199 (i.e., those certified by the NOC 180) communicating on the home media network 190 are configured with the same unique encryption key 1061, thereby allowing them to properly decode the multimedia data transmitted from the home media server 110.

In one embodiment, the encryption key 1061 is transmitted securely to the home media server 110 and media devices 191-199 through the conditional access system. Alternatively, or in addition, the key 1061 may be transmitted using conventional secure communication techniques such as Secure Sockets Layer ("SSL") or Data Encryption Standard ("DES").

Figure 11:
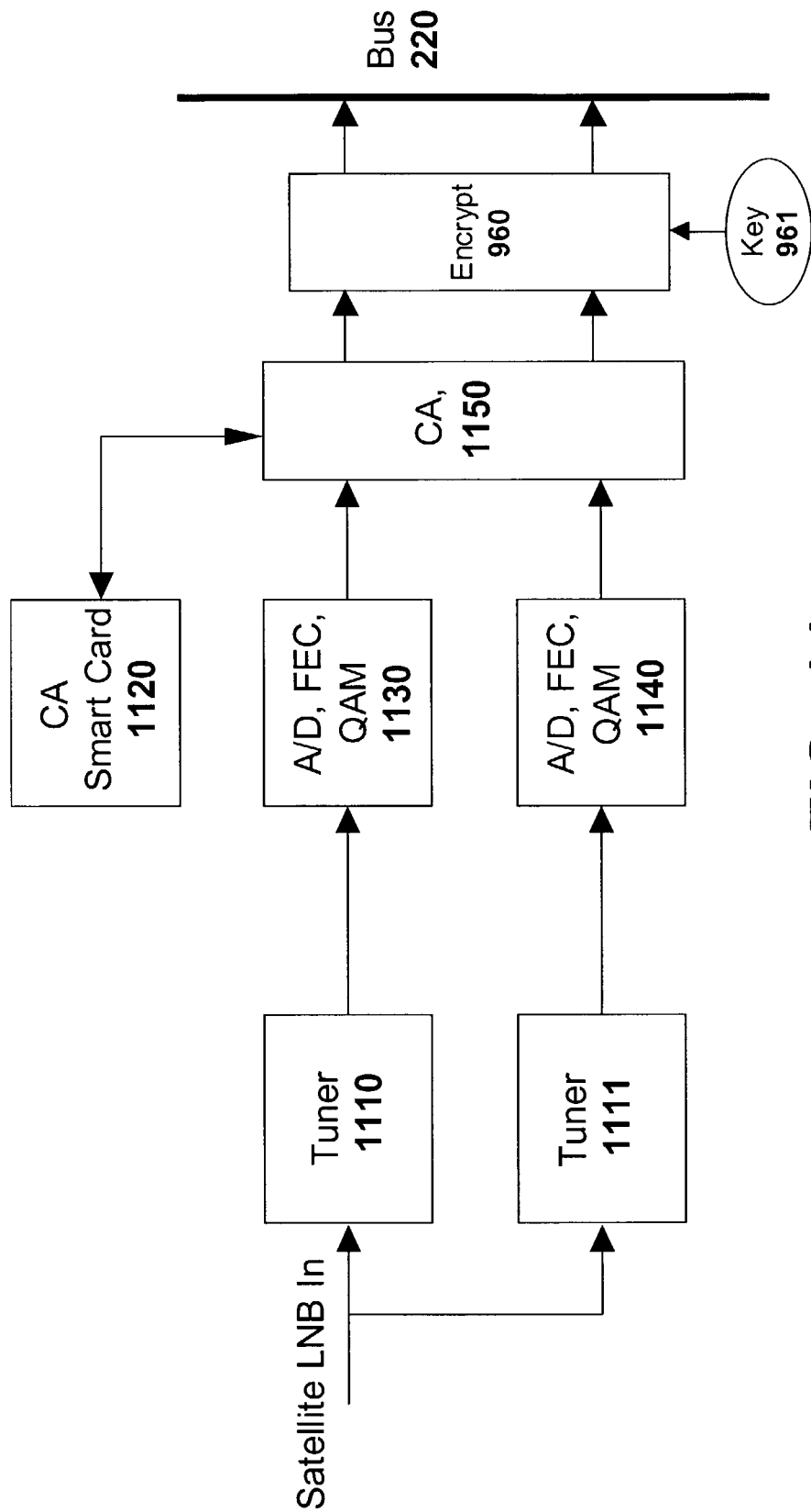
FIG. 11 illustrates a satellite module according to one embodiment of the invention.

One embodiment of a satellite module for connecting the home media server 110 over a satellite channel is illustrated in FIG. 11, including multiple tuners 1110, 1111; forward error correction modules 1130, 1140; a smartcard 1120 and associated conditional access module 1150; and an encryption module 960 for encrypting content transmitted onto the system bus 220 (and across the home media network 190). The different decoding, encryption, and authentication features described above with respect to the cable broadcast module illustrated in FIG. 10 are also configured into one embodiment of the satellite module.

Figure 12:
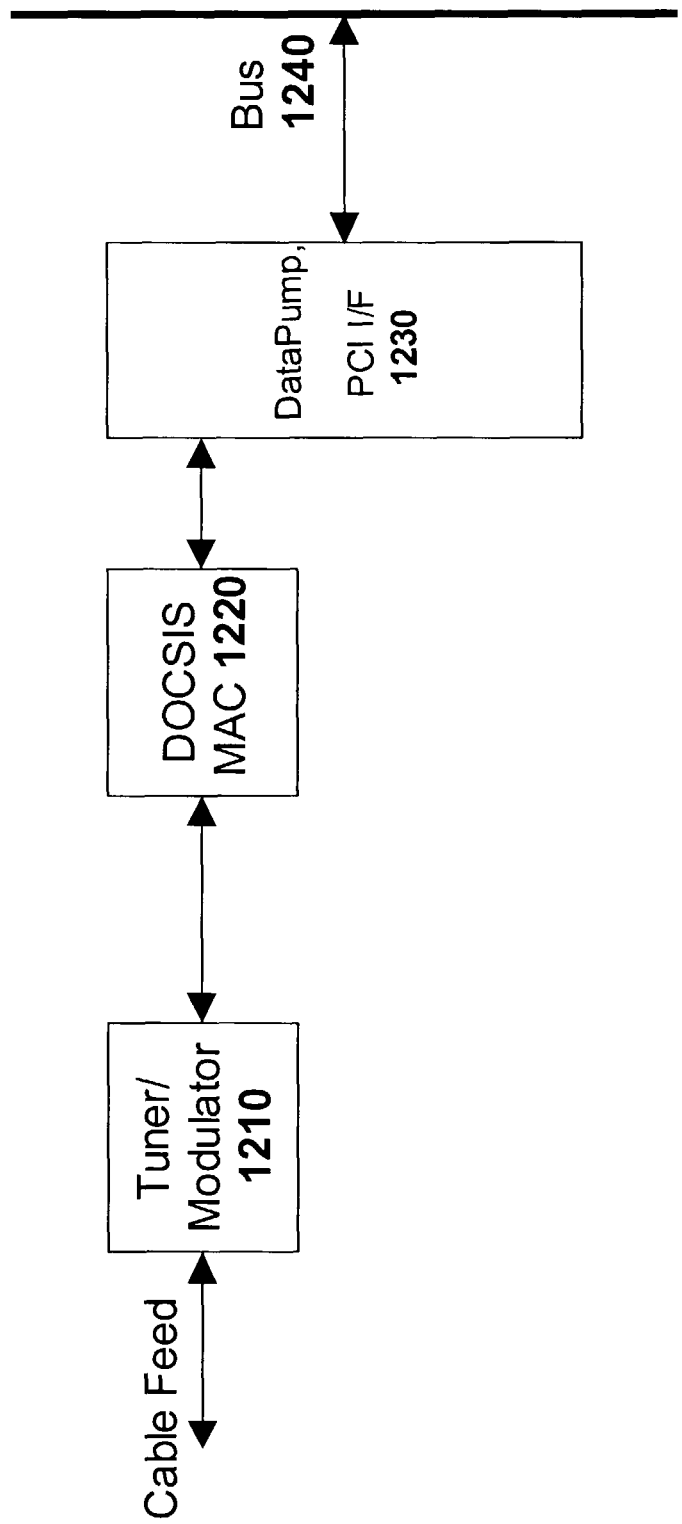
FIG. 12 illustrates a cable modem module according to one embodiment of the invention.

One embodiment of a cable modem for connecting the home media server 110 over a cable channel is illustrated in FIG. 12. The cable modem includes a modulator unit 910, a Data Over Cable Service Interface Specification ("DOCSIS") module 920, and a data pump/PCI interface unit 930. Various different types of cable modems may be coupled to the home media server 110 while still complying with the underlying principles of the invention.

Figure 13:
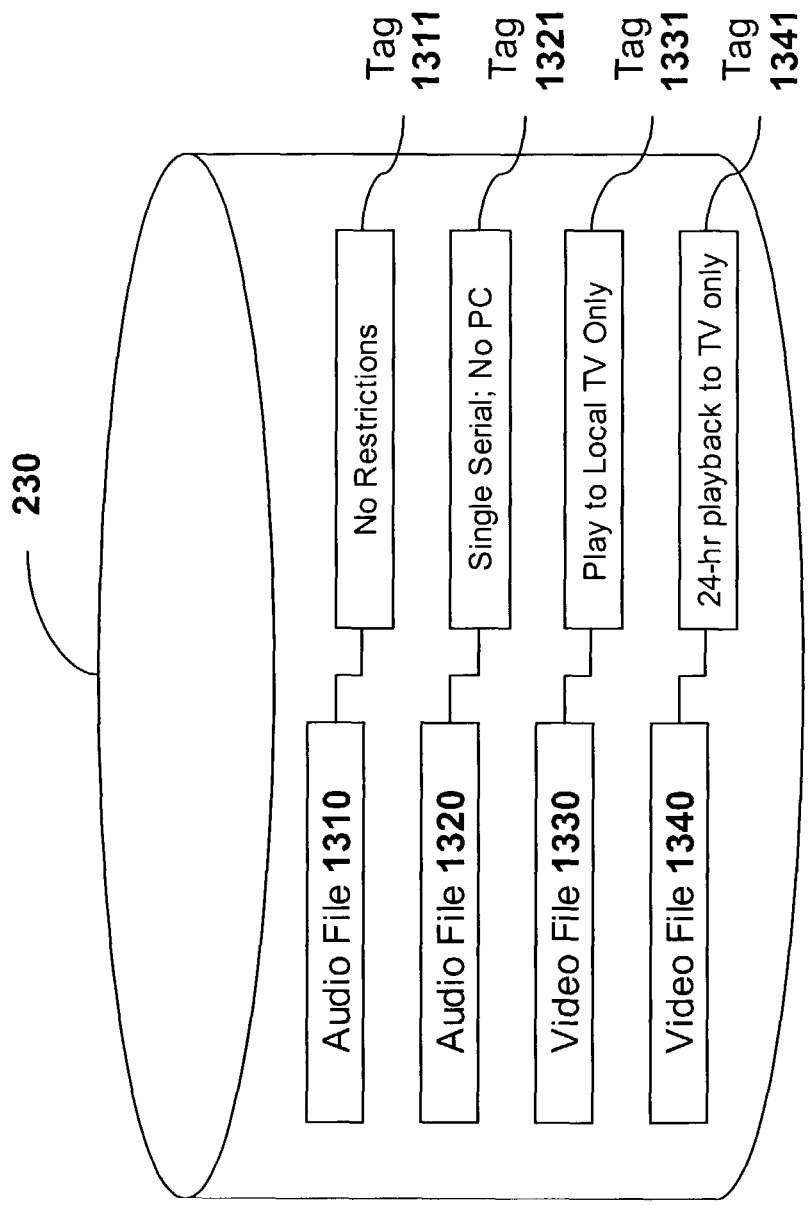
FIG. 13 illustrates copyright tags implemented in one embodiment of the invention.

In addition to the encryption system described above, one embodiment of the system provides copyright protection through the use of copyright tags associated with content stored on the home media server 110. The tags of this embodiment identify which types of content/information may be copied or streamed to which multimedia devices. As illustrated in FIG. 13, tags may be set to a variety of copy/playback levels, including, for example, a tag 1311 indicating no restrictions on copying for audio file 1310; a tag 1321 allowing only a single serial copy (e.g., to a CD-RW disk) with no copying to personal computers for audio file 1320; a tag 1331 permitting playback to local TVs (i.e., within the home media network 190) for video file 1330; and a tag 1341 allowing 24-hour playback to local TVs only (e.g., similar to a pay-per-view feature) for video file 1340. Accordingly, this embodiment provides an additional mechanism for providing secure storage and transmission of copyrightable material. In one particular embodiment, content providers (e.g., cable and satellite providers) are provided with the ability to program tags into their content as necessary.

Speculative Tuning

Figure 1:
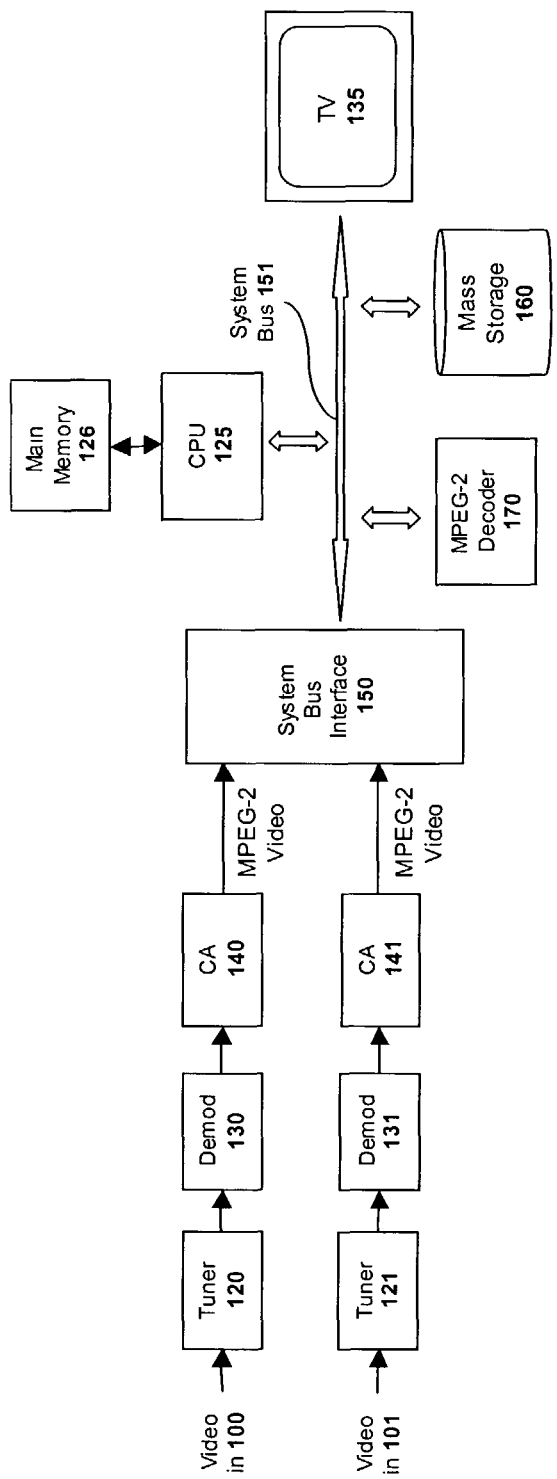
FIG. 1 illustrates a prior art personal video recorder ("PVR") system.

As described above with respect to the multi-tuner system illustrated in FIG. 1, when a single user is browsing through channels (i.e., and is not recording a program), only a single tuner in the multi-tuner system is utilized. As the user switches from one channel to the next, the tuner must change the carrier frequency at which it receives the multimedia signal and lock on to the new channel at the new carrier frequency. Depending on the type of tuners employed on the system, locking on to the new channel will typically take a perceptible amount of time, potentially frustrating users who "channel surf" (i.e., browse from one channel to the next to locate a program).

Figure 14:
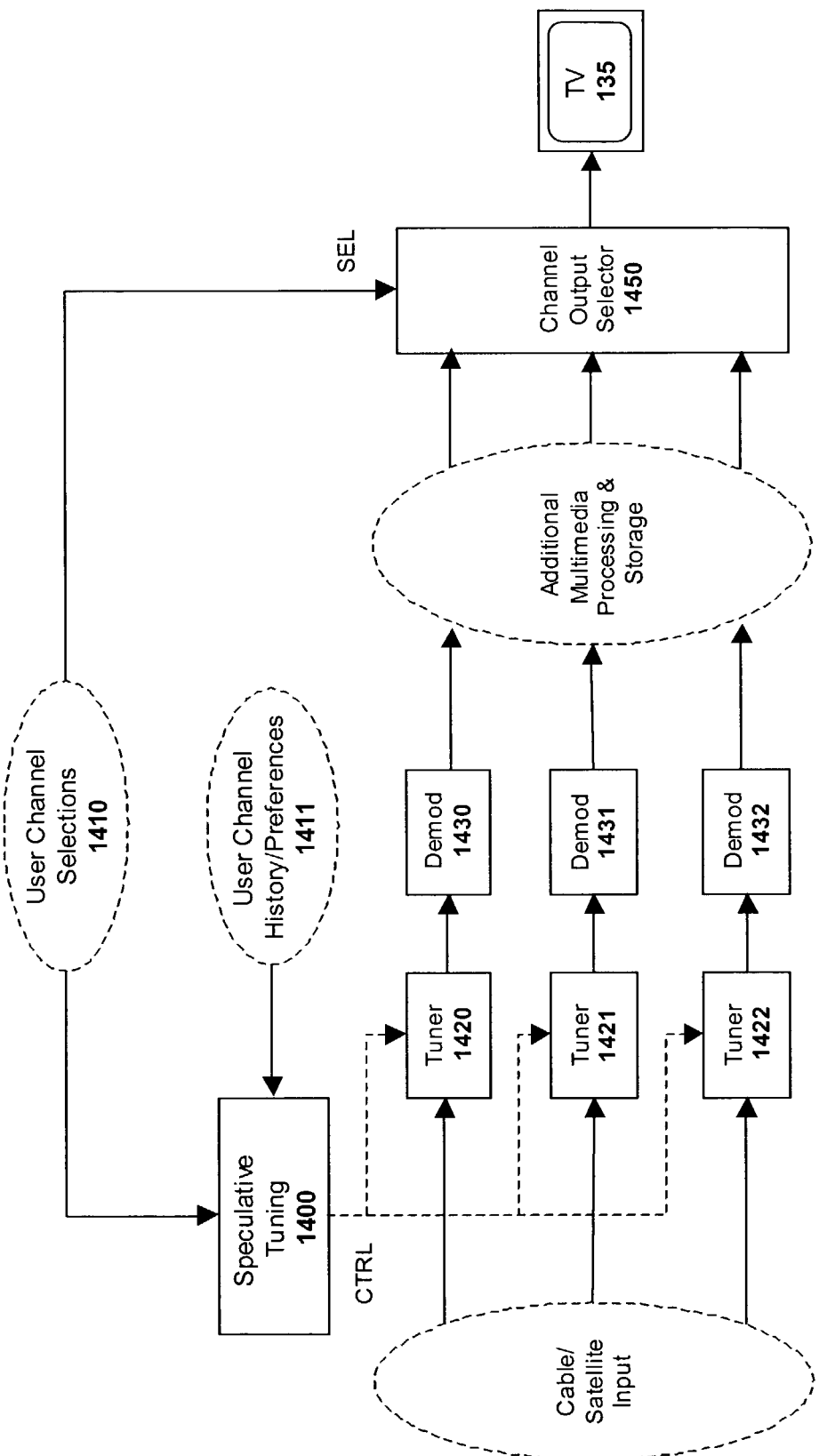
FIG. 14 illustrates one embodiment of a system for speculative tuning.

To improve the speed at which the system switches between channels, one embodiment of the invention, illustrated in FIG. 14, employs speculative tuning logic 1400 to speculate as to what the next selected channel will be. Specifically, in response to the user's channel selections 1410 and/or the user's historical channels selections and preferences 1411, the speculative tuning logic 1400 causes the additional, unused tuners to lock on to the speculated channels even before they have been selected by the user, thereby improving the tuning efficiency of the overall system.

By way of example and not limitation, if tuner 1420 is locked on to a channel currently being viewed by the user via one or more of the multimedia nodes 191-199, the speculative tuning logic 1400 may cause tuners 1421 and 1422 to tune to channels adjacent to the selected channel, in anticipation of the user pressing the "channel up" or "channel down" keys on the remote control. Thus, if tuner 1420 is tuned to channel 7, the channel selection logic 1400 may automatically cause tuners 1421 and 1422 to tune to channels 6 and 8, respectively (i.e., if these are valid channels). Subsequently, if the user hits the "channel up" key, channel 8, having already been tuned to by tuner 1422, will be readily available for rendering on a display device coupled to one or more of the multimedia nodes 191-199 once selected via a channel output selector 1450.

In one embodiment, channel output selector 1450 is an output signal multiplexer which selects a channel tuned to by one of the tuners 1420-1422 based on the user's channel selections 1410. It will be appreciated that the channel output selector 1450 may be implemented in software or any combination of hardware and software while still complying with the underlying principles of the invention.

Various additional speculative techniques may be employed by the speculative tuning logic 1400. For example, in one embodiment, when a user manually types in a particular channel number, the speculative tuning logic 1400 will cause one of the spare tuners to tune to that channel, even before the user hits the. "enter" key on the remote control (most remote controls require entry of channel number followed by an "enter" command). If the user selects the enter key, the channel will be provided via the channel output selector 1440. Once selected, the speculative tuning logic may then tune the remaining tuners to channels adjacent to the newly-selected channel (as described above).

One embodiment of the invention may be employed in conjunction with a user interface such as an electronic program guide ("EPG"), examples of which are set forth in FIGS. 15*a* and/or 15*b*. An embodiment of the invention may also be employed in conjunction with a user interface such as that described in commonly-owned U.S. patent application Ser. No. 10/097,174, filed Mar. 12, 2002, for "SYSTEM AND METHOD FOR FOCUSED NAVIGATION WITHIN AN INTERACTIVE TELEVISION USER INTERFACE", which application is incorporated herein by reference in its entirety.

A typical "grid guide" EPG is illustrated in FIG. 15*a*, in which each row represents a particular channel (e.g., such as HBO 1510) and each column represents a particular block of time (e.g., such as the 12:00-12:30 block 1530). The programs are represented by a plurality of irregular-shaped cells (e.g., cell 1520) which may extend across multiple columns, depending on the length of the represented programs. Using a remote control with directional keys (e.g., up, down, left and right), a user may select a particular program by highlighting the cell corresponding to the desired program (e.g., via selection element 1525) and pressing an enter key.

Figure 15B:
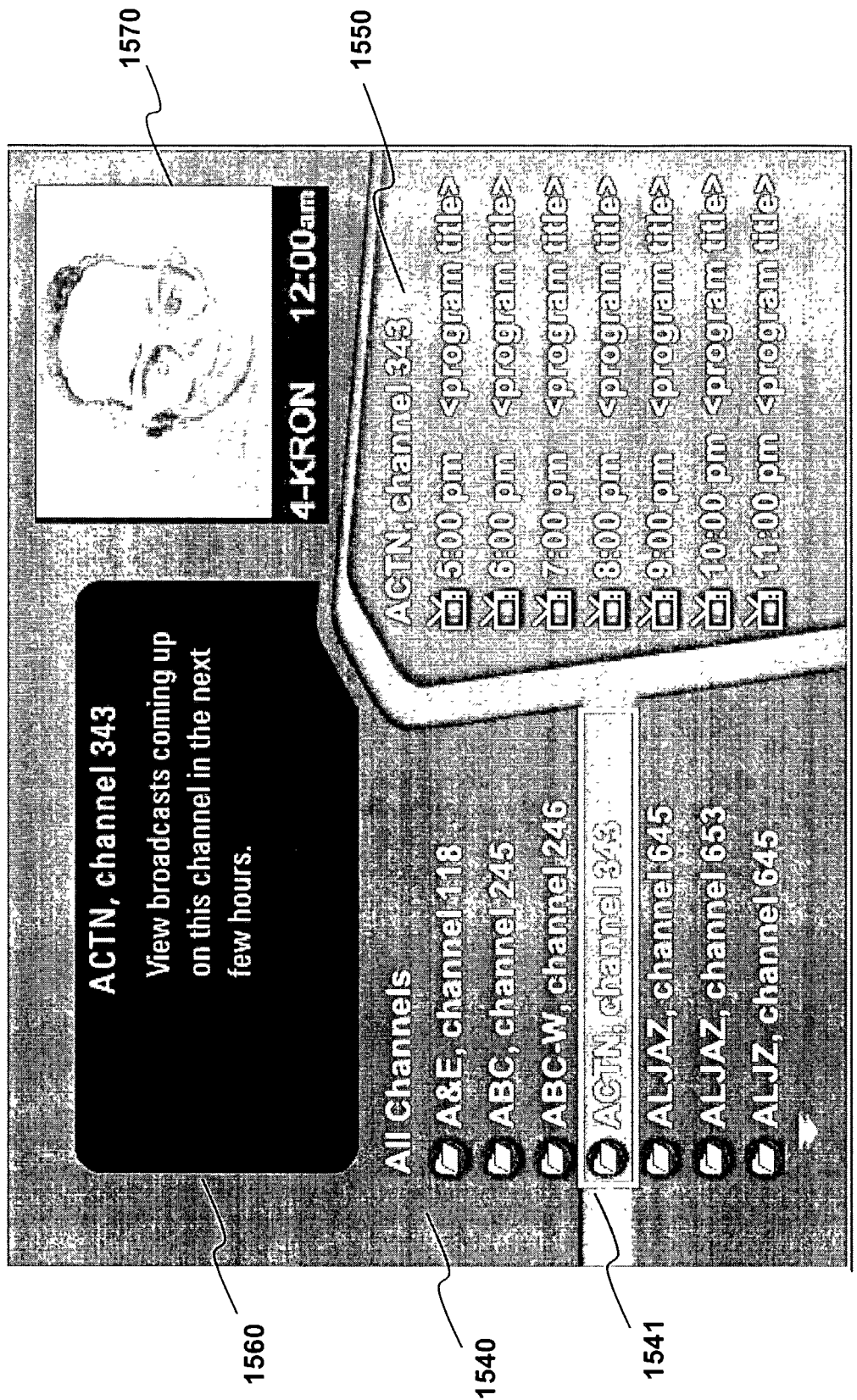

By contrast, a "hierarchical" EPG is illustrated in FIG. 15*b* comprised of first and second menu regions 1540 and 1550, respectively, a graphical information region 1560, and a video display region 1570. In this embodiment, the first menu region 1540 includes menu items higher up the menu hierarchy from the elements listed in the second menu region 1550. As a user moves up and down through the elements in the first menu region 1540, the list of selectable choices in the second menu region 1530 changes accordingly. In the specific example shown in FIG. 15*b*, the first menu region 1540 includes a list of available channels. As the user moves a selection element 1541 up and down through the channels, the schedule for each respective channel is displayed in the second menu region 1550. Although the list of channels in the first region 1540 is ordered alphabetically in FIG. 15*b*, the list of channels may be ordered in a variety of ways including, for example, consecutively while still complying with the underlying principles of the invention.

In one embodiment, the speculative tuning logic 1400 monitors the manner in which the user navigates throughout the EPG, and makes speculative tuning choices accordingly. For example, in one embodiment, when the user moves a selection element 1525, 1541 between programs/channels or cards, the speculative tuning logic 1400 may cause one of the available tuners to tune to the channel over which the selection element 1525, 1541 is positioned. Accordingly, if the user selects the highlighted element or card, the channel represented by the highlighted element or card will be immediately available to the television 135 (or other display device) via the channel output selector 1450. Moreover, if additional tuners are available, the speculative tuning logic 1400 may cause these tuners to tune to channels adjacent to the highlighted channel and/or adjacent to the current channel.

In one embodiment, the channel over which the selection element 1541 is positioned may be displayed in the video region 1570 of the EPG. In this embodiment, the speculative tuning logic 1400 may also cause tuners to tune to channels adjacent to the channel over which the selection element is positioned (e.g., in addition to causing tuners to tune to channels adjacent to the current channel, if a sufficient number of tuners are available). Alternatively, or in addition, the current program being viewed by the user may be displayed in the video region 1570 as the user navigates through the EPG.

In one embodiment, channels are selected by the speculative tuning logic 1400 based on the remote control functions available to the user when the EPG is displayed. For example, if the "channel up" and "channel down" commands still function normally when the EPG is displayed, then the speculative tuning logic 1400 may still reserve one or more tuners for channels adjacent to the current channel (i.e., not necessarily adjacent to the channel which is highlighted on the EPG). If, however, the "channel up" and "channel down" controls to not function when the EPG is displayed, then the speculative tuning logic 1400 may reserve one or more tuners for channels adjacent to the channel highlighted on the EPG. Various other channel speculation techniques may be employed while still complying with the underlying principles of the invention.

As indicated in FIG. 14, one embodiment of the system will continually monitor and record the user's channel selection history 1411. This information may then be used by the speculative tuning logic 1400 to anticipate channels which the user will select. For example, the user may watch the Simpsons at 6:00 each evening on a regular basis. Accordingly, if the user begins browsing channels at 6:00, one tuner may automatically be allocated to the channel on which the Simpsons is broadcast. Similarly, the user may jump between the three same news programs at a particular time during the day or evening before selecting one to view (e.g., FOX News, CNN, and a local news station). If a sufficient number of tuners are available, the speculative tuning logic 1400 may allocate one tuner to each of the three news programs as soon as the user tunes to any one of the news programs, or at a given time of the day. Various other types of user preference data may be employed to speculatively tune to particular channels.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while above description of the speculative tuning embodiments focus on video programming, the underlying principles may be implemented on pure audio programming as well. Additionally, while a large portion of the above description describes the invention in the context of multimedia recorder systems, the underlying principles may be implemented on any device employing multiple tuners. Accordingly, the scope and spirit of the invention should be judged in terms of the claims which follow.

The invention claimed is:

1. A method implemented on a media server for distributing multimedia content to a plurality of multimedia nodes within a home media network, said media server comprising a plurality of tuners, the method comprising:
    monitoring user input to said plurality of multimedia nodes within said home media network;
    storing a plurality of histories of which channels are watched on each of the plurality of multimedia nodes, each history being associated with a respective user of a particular multimedia node;
    identifying and grouping at said media server a set of channels independently of any current channel selected or display position, the set of channels being grouped based upon a probability that the user of the particular multimedia node included in the plurality of multimedia nodes is likely to switch between the set of channels based on a respective history of the user of the particular multimedia node;
    in response to said user of said particular multimedia node navigating an electronic program guide, speculatively tuning to but not rendering a first channel from said grouped set of channels based on a position of a selection element within the electronic program guide, and speculatively tuning to but not rendering multimedia streams of the remaining non-selected channels from said grouped set, using tuners of said media server, prior to said user of said particular multimedia node selecting said remaining channels; and
    transmitting content from a second channel to said particular multimedia node in response to said user of said particular multimedia node affirmatively selecting said second channel, wherein said second channel is one of said channels of said grouped set of remaining non-selected channels.

2. The method as in claim 1, further comprising
    rendering multimedia content from said second channel on a multimedia rendering device coupled to said second multimedia node responsive to said user of said first multimedia node affirmatively selecting said second channel.

3. The method as in claim 1, wherein monitoring user input comprises monitoring a manner in which said user of said first multimedia node manipulates a selection element associated with a user interface, and
    wherein said grouped set of channels is identified based on times of day that channels in said grouped set of channels are watched as stored in said history and said manner in which said user of said first multimedia node manipulates said selection element at said current time of day.

4. A media server for distributing multimedia content to a plurality of multimedia nodes within a home media network comprising:
    a plurality of tuners to tune to broadcast channels received from a broadcast communication network;
    channel grouping logic operable to identify a plurality of channel groups, each channel group comprising a plurality of channels amongst which a particular user selected from a plurality of users frequently switches based on usage history associated with the particular user, the channel grouping logic being further operable to associate the plurality of channels in a channel group with one another; and
    speculative tuning logic to identify which of the plurality of channel groups a currently highlighted channel belongs to responsive to said particular user navigating an electronic program guide interface and prior to the particular user selecting the current channel to watch from one of said plurality of channel groups, to speculatively tune to but not render multimedia content on two or more channels from said identified channel group one of said speculatively tuned channels comprising the currently highlighted channel prior to the particular user affirmatively selecting the channel using the electronic program guide, using two or more of said plurality of tuners, prior to said particular user of said first multimedia node selecting a next channel.

5. The media server as in claim 4, the media server further comprising:
a channel output selector to provide multimedia content from a channel to a multimedia rendering device within said home media network responsive to said user of said first multimedia node selecting said channel.

6. The media server as in claim 4, wherein said channel grouping logic identifies said channel groups based on the times of day at which channels are watched as stored in a history and said user selecting said first channel to watch at a current time of day.

7. The media server as in claim 4, wherein said channel grouping logic identifies said channel groups based on the times of day at which channels are watched as stored in a history and a manner in which said user of said first multimedia node manipulates a selection element associated with a user interface at a particular time of day.

8. A method implemented on a media server for distributing multimedia content to a plurality of multimedia nodes within a home media network, the media server comprising a plurality of tuners, the method comprising:
monitoring channel selection by a particular user of a first multimedia node within said home media network;
storing a history of which channels are watched by the particular user on said first multimedia node included in the plurality of multimedia nodes;
grouping a plurality of channels together based upon the stored history of channels watched on the first multimedia node, the grouping being performed independently of a current channel selected or a last channel selected;
in response to said particular user navigating an electronic program guide to select a channel to watch, determining whether a highlighted channel is in the grouped plurality of channels;
in response to determining that the highlighted channel is not in the grouped plurality of channels, speculatively tuning, using two of the plurality of tuners of said media server, to a second channel that is logically adjacent to said highlighted channel in the grouped plurality of channels and to a third channel that is logically adjacent to said highlighted channel in the grouped plurality of channels, said speculative tuning occurring without rendering multimedia content for said second channel or said third channel prior to selection of said second channel or said third channel by said particular user of said first multimedia node, and speculatively tuning using a third of the plurality of tuners to the highlighted channel without rendering multimedia content for said highlighted channel prior to selection of said highlighted channel by said particular user.

9. The method as in claim 8, further comprising:
rendering multimedia content from said second channel on a multimedia rendering device responsive to selection of said second channel by said particular user of said first multimedia node; and
rendering multimedia content from said third channel on said multimedia rendering device responsive to selection of said third channel by said particular user of said first multimedia node.

10. The method as in claim 8, wherein monitoring comprises determining a channel which said particular user of said first multimedia node has selected for viewing.

11. A system for distributing multimedia content to a plurality of multimedia nodes within a home media network, the system comprising:
a media server for distributing multimedia content to a plurality of multimedia nodes within the home media network;
a plurality of tuners to tune to broadcast channels coupled to said media server; and
speculative tuning logic coupled to said media server, operable to group a plurality of channels together responsive to user history and independent of a current or last channel selected, and in response to a particular user from a plurality of users of a first multimedia node navigating an electronic program guide, determine whether a highlighted channel is within the grouped plurality of channels, speculatively tune to a subset of said grouped plurality of channels comprising the highlighted channel and two or more channels that are logically adjacent to said highlighted channel in the grouped plurality of channels using two of said plurality of tuners, said speculative tuning occurring without rendering multimedia content associated with the subset of said grouped plurality of channels prior to receiving an affirmative channel change request.

12. The system as in claim 11, further comprising:
a channel output selector providing multimedia content from a channel to a multimedia rendering device within the home media network responsive to said user of said first multimedia node selecting said channel.

13. A method implemented on a media server for distributing multimedia content to a plurality of multimedia nodes within a home media network, said media server comprising a plurality of tuners, the method comprising:
monitoring user input to said plurality of multimedia nodes within said home media network, the plurality of multimedia nodes including a first multimedia node;
identifying and grouping at said media server a set of channels which a particular user from a plurality of users of said first multimedia node is likely to switch between prior to the user changing to any of the channels in the grouped set of channels;
in response to said particular user of said first multimedia node navigating an electronic program guide, speculatively tuning to but not rendering a multimedia stream on two or more channels from said set of channels based upon a current position of a selection tool within the electronic program guide, using two or more tuners of said media server, prior to said particular user of said first multimedia node affirmatively selecting a channel using the electronic program guide; and
transmitting content from a second channel to said first multimedia node in response to said particular user of said first multimedia node affirmatively selecting said second channel, wherein said second channel is one of said two or more channels of said set.

14. The method as in claim 8, wherein whether said second channel and said third channel are considered logically adjacent is based on said second channel being selectable by said user providing one of a "channel up" or a "channel down" command to said first multimedia node and based on said third channel being selectable by said particular user providing the other of said "channel up" or said "channel down" command to said first multimedia node.

15. The method as in claim 8, wherein whether said second channel and said third channel are considered logically adjacent is based on said second channel and said third channel being a next or a previous channel in a numerical sequence with respect to said first channel.

16. The method as in claim 8, wherein whether said second channel and said third channel are considered logically adjacent is based on said second channel and said third channel being a next or a previous channel in alphabetical sequence with respect to said first channel.

17. The system as in claim 11, wherein whether said second channel and said third channel are considered logically adjacent is based on said second channel being selectable by said user providing one of a "channel up" or a "channel down" command to said first multimedia node and based on said third channel being selectable by said user providing the other of said "channel up" or said "channel down" command to said first multimedia node.

18. The system as in claim 11, wherein whether said second channel and said third channel are considered logically adjacent is based on said second channel and said third channel being a next or a previous channel in a numerical sequence with respect to said first channel.

19. The system as in claim 11, wherein whether said second channel and said third channel are considered logically adjacent is based on said second channel and said third channel being a next or a previous channel in alphabetical sequence with respect to said first channel.

\* \* \* \* \*